United States Patent
Zhou et al.

(10) Patent No.: US 9,420,543 B2
(45) Date of Patent: Aug. 16, 2016

(54) CONTROL OF TRANSMISSION POWER ON HIGH-SPEED DEDICATED PHYSICAL CONTROL CHANNEL

(75) Inventors: Yan Zhou, San Diego, CA (US); Vinay Chande, San Diego, CA (US); Farhad Meshkati, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 13/315,216

(22) Filed: Dec. 8, 2011

(65) Prior Publication Data

US 2012/0322494 A1 Dec. 20, 2012

Related U.S. Application Data

(60) Provisional application No. 61/422,014, filed on Dec. 10, 2010.

(51) Int. Cl.
| | |
|---|---|
| *H04W 52/14* | (2009.01) |
| *H04W 52/16* | (2009.01) |
| *H04W 52/24* | (2009.01) |
| *H04W 36/30* | (2009.01) |

(Continued)

(52) U.S. Cl.
CPC ............. *H04W 52/16* (2013.01); *H04W 36/30* (2013.01); *H04W 52/24* (2013.01); *H04W 52/325* (2013.01); *H04W 52/146* (2013.01); *H04W 52/241* (2013.01); *H04W 52/242* (2013.01); *H04W 52/244* (2013.01); *H04W 52/245* (2013.01); *H04W 52/40* (2013.01)

(58) Field of Classification Search
None
See application file for complete search history.

(56) References Cited

U.S. PATENT DOCUMENTS

| | | | |
|---|---|---|---|
| 8,285,321 B2 | 10/2012 | Ji et al. | |
| 2002/0119799 A1 | 8/2002 | Moulsley et al. | |

(Continued)

FOREIGN PATENT DOCUMENTS

| | | |
|---|---|---|
| EP | 2117239 A1 | 11/2009 |
| JP | 2003134046 A | 5/2003 |

(Continued)

OTHER PUBLICATIONS

International Search Report and Written Opinion—PCT/US2011/064274—ISA/EPO—May 18, 2012.

(Continued)

*Primary Examiner* — Philip Sobutka
(74) *Attorney, Agent, or Firm* — Fariba Yadegar-Bandari; Jia Wu; Tyler J. Overall

(57) ABSTRACT

Methods for management of high-speed dedicated physical control channel decoding in soft handover procedures include various methods that include controlling reverse link transmission power. Different algorithms may be used for controlling transmission power, including algorithms summarized as determining path-loss differences, determining a difference between pilot channel power from HSDPA serving and non-serving NodeBs, and adjusting a signal-to-interference target, an attenuation factor, or similar parameters for controlling reverse link power. Another of the management methods includes selecting a HSDPA serving NodeB for a mobile entity jointly based on the downlink and uplink channel quality, loading, and resource availability. The methods, and aspects of the methods, may be embodied in wireless communications apparatus, for example, in a NodeB or mobile entity.

25 Claims, 21 Drawing Sheets

(51) Int. Cl.
*H04W 52/32* (2009.01)
*H04W 52/40* (2009.01)

(56) References Cited

U.S. PATENT DOCUMENTS

| | | |
|---|---|---|
| 2003/0039217 A1 | 2/2003 | Seo et al. |
| 2004/0019513 A1 | 1/2004 | Colalancia et al. |
| 2004/0097234 A1 | 5/2004 | Rajkotia et al. |
| 2007/0053318 A1 | 3/2007 | Proctor, Jr. et al. |
| 2008/0166976 A1 | 7/2008 | Rao |
| 2012/0208589 A1* | 8/2012 | Kiyoshima et al. ........... 455/522 |

FOREIGN PATENT DOCUMENTS

| | | |
|---|---|---|
| JP | 2009539319 A | 11/2009 |
| JP | 2010516184 A | 5/2010 |
| WO | 2004019513 A1 | 3/2004 |
| WO | WO-2007142893 A1 | 12/2007 |
| WO | WO-2008085936 A2 | 7/2008 |
| WO | 2009140634 | 11/2009 |

OTHER PUBLICATIONS

Motorola: "HS-DPCCH Power Control in Soft-Handoff", 3GPP Draft; RI-02-0719, 3rd Generation Partnership Project (3GPP), Mobile Competence Centre ; 650, Route Des Lucioles ; F-06921 Sophia-Antipolis Cedex ; France, vol. RAN WG1, no. Gyeongju, Korea; May 22, 2002, XP050096312, [retrieved on May 22, 2002] the whole document.

Nokia et al: "Text proposal for mobility requirements for UTRA to E-UTRA", 3GPP Draft; R4-080773, 3rd Generation Partnership Project (3GPP), Mobile Competence Centre ; 650, Route Des Lucioles ; F-06921 Sophia-Antipolis Cedex; France, vol. RAN WG4, no. Shenzhen, China; Mar. 28, 2008, XP050179384, [retrieved on Mar. 28, 2008] abstract section 4.2.

3GPP TSG RAN, FDD Enhanced Uplink, Overall Description, Stage 2 Release 6, 3GPP TS 25.309, v6.6.0, Mar. 1, 2006, pp. 1-34 (pp. 21-29).

Lee J.H., et al., "Uplink Power Control Scheme for Reliable Feedback Signalling in HSDPA," CIC'02 Proceedings of the 7th CDMA international conference on Mobile communications, 2002, pp. 41-50.

* cited by examiner

2010 — RANKING THE SELECTED NODE B HIGHER IN RESPONSE TO A DOWNLINK LOADING FOR THE SELECTED NODE B BEING LESS THAN A DOWNLINK LOADING FOR THE NODE B HAVING THE MAXIMUM ECP/IO

2020 — RANKING THE SELECTED NODE B HIGHER IN RESPONSE TO AN UPLINK PATH LOSS FOR THE SELECTED NODE B BEING LESS THAN AN UPLINK PATH LOSS FOR THE NODE B HAVING THE MAXIMUM ECP/IO

2030 — RANKING THE SELECTED NODE B HIGHER IN RESPONSE TO AN UPLINK POWER SPECTRAL DENSITY FOR THE SELECTED NODE B BEING LESS THAN AN UPLINK POWER SPECTRAL DENSITY FOR THE NODE B HAVING THE MAXIMUM ECP/IO

2040 — RANKING THE SELECTED NODE B HIGHER IN RESPONSE TO A POWER RESOURCE FOR THE SELECTED NODE B BEING GREATER THAN A POWER RESOURCE FOR THE NODE B HAVING THE MAXIMUM ECP/IO

2050 — RANKING THE SELECTED NODE B HIGHER IN RESPONSE TO THE SUM OF UPLINK PATH LOSS AND UPLINK POWER SPECTRAL DENSITY FOR THE SELECTED NODE B BEING LESS THAN AN AGGREGATION OF UPLINK PATH LOSS AND UPLINK POWER SPECTRAL DENSITY FOR THE NODE B HAVING THE MAXIMUM ECP/IO

CONTROL OF TRANSMISSION POWER ON HIGH-SPEED DEDICATED PHYSICAL CONTROL CHANNEL

CROSS-REFERENCE TO RELATED APPLICATION

This application claims priority pursuant to 35 U.S.C. §119 (e) to U.S. provisional application Ser. No. 61/422,014, filed Dec. 10, 2010, which is hereby incorporated by reference, in its entirety.

BACKGROUND

1. Field

The present application relates generally to wireless communications, and more specifically to management of high-speed dedicated physical control channel decoding in soft handover procedures.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities (MEs), such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL, also called "forward link") and Single-Carrier Frequency Division Multiple Access (SC-FDMA) on the uplink (UL, also called "reverse link"). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), and Universal Mobile Telecommunication System (UMTS). These wireless communication systems and LTE systems generally use different radio access technologies (RATs) and communication protocols, operate at different frequency bands, provide different quality of service (QoS) and offer different types of services and applications to the system users.

Multiple mode mobile entities that are capable of operating on multiple heterogeneous wireless communication systems are commonly available, for use with different communication systems. For example, many geographic areas are now served by multiple wireless communication systems, each of which can utilize one or more different air interface technologies. To increase versatility of wireless terminals in such a network environment, there recently has been an increasing trend toward multi-mode wireless terminals that are able to operate with multiple radio technologies. A multi-mode implementation may enable a terminal to select a system from among multiple systems in a geographic area, each of which may utilize different radio interface technologies, and subsequently communicate with one or more chosen systems. In the alternative, or in addition, a heterogeneous communications system may include access points transmitting at various different power levels, for example lower-power femtocells or picocells interspersed with higher-power macrocells. In addition, access points, for example lower-power access points, may be deployed in an ad hoc or unplanned manner within a system. Consequently, different systems and access points may be accessible to the same ME, according to some order of preference of system operator identity and system technology. These conditions create new issues and challenges in efficiently managing multiple modes for user equipment, terminals and other nodes, for example in soft handover contexts wherein an access terminal may be communicating with diverse access points.

SUMMARY

The present application discloses improved methods and apparatus for management of high-speed dedicated physical control channel (HS-DPCCH) decoding in soft handover procedures. As described in more detail herein, HS-DPCCH decoding may be related to HS-DPCCH transmission power, common pilot channel (CPICH) transmission power, or other power factors. Thus, management of HS-DPCCH decoding may include aspects of controlling transmission power, selecting a serving node in response to power factors, and other power-related operations and methods as summarized in this section and described in more detail in the detailed description.

In an aspect, a base station may perform a method for controlling transmission power of a mobile entity in a wireless communication network. This method may sometimes referred to herein as a path-loss difference method, by way of identification only and not by way of limitation. The method may include determining a difference indicative of an amount by which path loss for a wireless link between the mobile entity and a serving NodeB of the wireless communications network exceeds a minimum of path losses for wireless links between the mobile entity and non-serving NodeBs of the wireless network. The method may further include instructing the mobile entity to boost a traffic-to-pilot transmission power offset for transmissions on a high-speed dedicated physical control channel to the serving NodeB, in proportion to the difference.

In an aspect of the foregoing method, determining the difference may further include comparing path loss between the serving NodeB and the mobile entity as reported by the mobile entity to a minimum of one or more path losses between the non-serving NodeBs and the mobile entity as reported by the mobile entity. In addition, determining the difference may include comparing received total wideband power (RTWP) from the serving NodeB to a minimum of RTWP from one or more of the non-serving NodeBs. In a more particular aspect, determining the difference may further include comparing an aggregation of the path loss and RTWP from the serving NodeB to a minimum aggregation of the path loss and RTWP among one or more of the non-serving NodeBs.

In an alternative aspect, determining the difference may further include comparing a target RTWP for the serving NodeB to a minimum of target RTWPs as reported by one or more of the non-serving NodeBs. In such embodiments of the method, determining the difference may further include comparing an aggregation of the path loss and a target RTWP for the serving NodeB to a minimum aggregation of the path loss and the target RTWP among one or more of the non-serving NodeBs.

In another alternative aspect, determining the difference may further include comparing received RTWP from the serving NodeB as reported by the mobile entity to a minimum of RTWP from one or more of the non-serving NodeBs as reported by the mobile entity. In the alternative, or in addition, determining the difference may further include comparing a target RTWP for the serving NodeB to a minimum of target RTWPs as reported by one or more of the non-serving NodeBs.

In another alternative aspect, determining the difference may further include comparing a CPICH transmission power of a serving NodeB of the wireless communications network to a minimum CPICH transmission power of non-serving NodeBs. In such embodiments of the method, determining the difference may further include comparing the CPICH transmission power of the serving NodeB aggregated with one or both of RTWP from the serving NodeB as reported by the mobile entity and a target RTWP for the serving NodeB, to a minimum aggregation of CPICH transmission power and RTWP among one or more of the non-serving NodeBs as reported by one or more of the non-serving NodeBs.

A method complementary to the foregoing path-loss difference method, which is performed by a base station or other network entity, may be performed by a mobile entity in communication with the base station. The complementary path-loss difference method for controlling transmission power in a mobile entity of a wireless communication network may include receiving a difference indicating an amount by which path loss for a wireless link between the mobile entity and a serving NodeB of the wireless communications network exceeds a minimum of path losses for wireless links between the mobile entity and non-serving NodeBs of the wireless network. The method for performance by the mobile entity may further include boosting a traffic-to-pilot transmission power offset for transmissions on a high-speed dedicated physical control channel to the serving NodeB, in proportion to the difference.

In another aspect, the complementary path-loss difference method for performance by the mobile entity may further include reporting a path loss between the serving NodeB and the mobile entity and one or more path losses between the non-serving NodeBs and the mobile entity to a radio network controller for determining the difference. In another aspect, the method may include reporting RTWP from the serving NodeB and RTWP from one or more of the non-serving NodeBs to a radio network controller for determining the difference.

In a related aspect, a non-serving base station (NodeB) may perform a method of equalizing path loss for CPICH transmissions from one or more mobile entities of a wireless communication network. This method may sometimes be referred to herein as a serving/non-serving CPICH difference method, by way of identification only and not by way of limitation. The method may include determining an attenuation factor as a maximum value selected from zero and a difference between CPICH transmission power of a serving NodeB of the wireless communications network and CPICH transmission power of a non-serving NodeB capable of participating in a soft handover procedure involving the mobile entity. The method may further include attenuating power from the mobile entity at the non-serving NodeB in response to the attenuation factor, for example in an amount proportional to the attenuation factor value.

In an aspect, the method may include performing the attenuating power at the non-serving NodeB for all incoming wireless signals using attenuator hardware. In another aspect, the method may include performing the attenuating power at the non-serving NodeB for wireless signals from a mobile entity served by the serving NodeB by modifying estimated interference plus noise in an uplink power control algorithm. For example, the uplink power control algorithm may be configured to modify the estimated interference plus noise by adding the attenuation factor plus noise for the mobile entity link to the non-serving NodeB, less a noise floor for the non-serving NodeB.

In another aspect, the serving/non-serving CPICH difference method may include obtaining the CPICH transmission power of the serving NodeB via a wireless broadcast from the serving NodeB. In the alternative, or in addition, the method may include obtaining the CPICH transmission power of the serving NodeB by request to serving NodeB via a backhaul connection.

Another method for controlling transmission power from a mobile entity of a wireless communication network may be performed by a network entity based on determining a signal-to-interference (SIR) target adjustment amount factor. This method may sometimes referred to herein as a SIR target adjustment method, by way of identification only and not by way of limitation. The SIR target adjustment factor may include determining a SIR target adjustment amount factor based on at least one of differential path loss and powerpath loss, CPICH transmission power, and RTWP criteria for a serving NodeB for the mobile entity and a non-serving NodeB capable of participating in a soft handover procedure with the serving NodeB. The method may include providing an adjusted SIR target to the non-serving NodeB, in response to the SIR target adjustment factor. In a more detailed aspect of the SIR target adjustment method, the network entity may determine the SIR target adjustment factor to be a maximum selected from (i.e., the greater of) zero and a difference between (a) a sum of path loss from the mobile entity plus RTWP from a serving NodeB of the wireless communications network as reported by the mobile entity and (b) a sum of path loss from the mobile entity plus RTWP from the non-serving NodeB as reported by the mobile entity. In the alternative, the network entity may determine the SIR target adjustment factor to be a maximum value selected from zero and a difference between CPICH transmission power of the serving NodeB and CPICH transmission power of the non-serving NodeB.

In an aspect, the SIR target adjustment method may include determining the SIR target adjustment factor to incorporate a transmission power differential between the serving NodeB and the non-serving NodeB. The method may include determining the SIR target adjustment factor to incorporate target rise over thermal (RoT) RTWP differential between the serving NodeB and the non-serving NodeB.

A complementary SIR target adjustment method may be used for controlling transmission power from a mobile entity. The method may include receiving a SIR target adjustment amount factor based on at least one of differential path loss and powerpath loss, CPICH transmission power, and RTWP criteria for a serving NodeB for the mobile entity and a non-serving NodeB capable of participating in a soft handover procedure with the serving NodeB. The method may further include adjusting a SIR target on the non-serving NodeB according to the SIR target adjustment factor. In a related aspect, the method for performance by the mobile entity may include providing a CPICH transmission power of the non-serving NodeB to a radio network controller for determining the SIR target adjustment factor. The method may further include providing the SIR target adjusted by the SIR target adjustment factor to the mobile entity.

In another aspect, a method for selecting a serving NodeB for a mobile entity in a wireless communication network may be performed by a network entity based on a downlink ratio of pilot energy to total received power spectral density (Ecp/Io) at the mobile entity. This method may sometimes referred to herein as a Ecp/Io ratio method, by way of identification only and not by way of limitation. The Ecp/Io ratio method may include determining a downlink ratio of pilot energy to total received power spectral density (Ecp/Io) at the mobile entity and at least one secondary measure, for each of multiple NodeBs of the wireless network. The method may further include determining a maximum of the Ecp/Io for the multiple NodeBs. The method may further include selecting a NodeB from the multiple NodeBs to be the serving NodeB for the mobile entity so that (a) the selected NodeB has an Ecp/Io not more than a defined amount less than the maximum Ecp/Io, and (b) the selected NodeB is ranked higher than the NodeB having the maximum Ecp/Io according to the secondary measure.

In an aspect of the Ecp/Io ratio method, the secondary measure includes a downlink loading and the selected NodeB is ranked higher in response to the downlink loading for the selected NodeB being less than the downlink loading for the NodeB having the maximum Ecp/Io. In another aspect, the secondary measure includes an uplink path loss and the selected NodeB is ranked higher in response to the uplink path loss for the selected NodeB being less than the uplink path loss for the NodeB having the maximum Ecp/Io. In another aspect, the secondary measure includes an uplink power spectral density and the selected NodeB is ranked higher in response to the uplink power spectral density for the selected NodeB being less than the uplink power spectral density for the NodeB having the maximum Ecp/Io. In another aspect, the secondary measure includes the sum of uplink path loss and uplink power spectral density and the selected NodeB is ranked higher in response to the sum of uplink path loss and uplink power spectral density for the selected NodeB being less than the sum of uplink path loss and uplink power spectral density for the NodeB having the maximum Ecp/Io. In another aspect, the secondary measure includes a power resource and the selected NodeB is ranked higher in response to the power resource for the selected NodeB being greater than the power resource for the NodeB having the maximum Ecp/Io.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transient computer-readable storage medium holding encoded instructions, which when executed by a processor, cause a wireless communications apparatus to perform the methods and aspects of the methods as summarized above.

BRIEF DESCRIPTION OF THE DRAWINGS

FIG. 20 shows further aspects of the method of FIG. 19.

DETAILED DESCRIPTION

Figure 1:
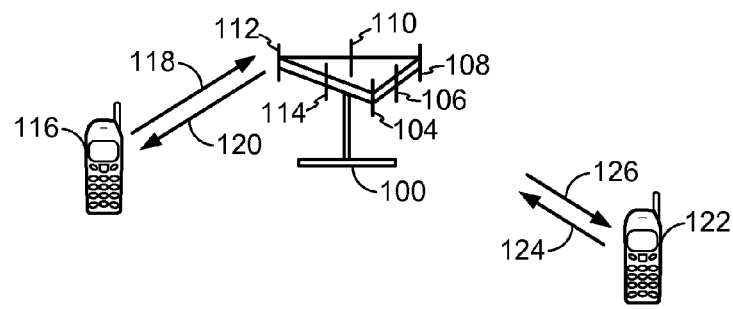
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA may be especially useful for uplink communications where lower PAPR benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), cell, or the like) includes multiple antenna groups, one including 104 and 106, another including 108 and 110, and an additional one including 112 and 114. As used herein, "NodeB" may be used generally to include eNBs and other base stations or cells, and not to exclude any particular type of wireless access point used in wireless communications systems. In FIG. 1, two antennas are shown for each antenna group, however, more or fewer antennas may be utilized for each antenna group. A mobile entity (ME) 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as an access point, a NodeB, an eNB, or some other terminology. A mobile entity may also be referred to as an access terminal (AT), a user equipment (UE), a mobile station, a wireless communication device, terminal, or the like.

Figure 2:
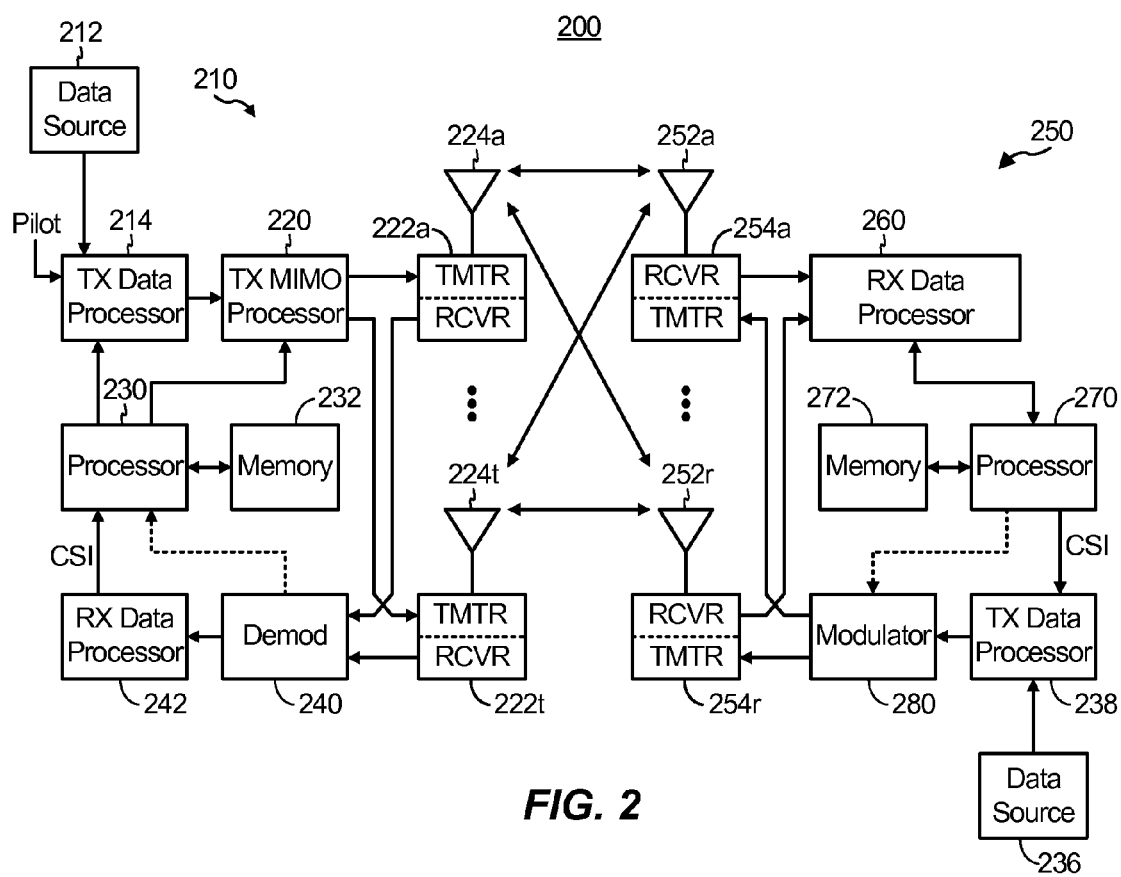
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232 holding program instructions and/or data, such as may be used for performing one or more methods as described herein.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion, and may be in operative communication with a memory 272 holding program instructions and/or data, such as may be used for performing one or more methods as described herein.

The reverse link message may include various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
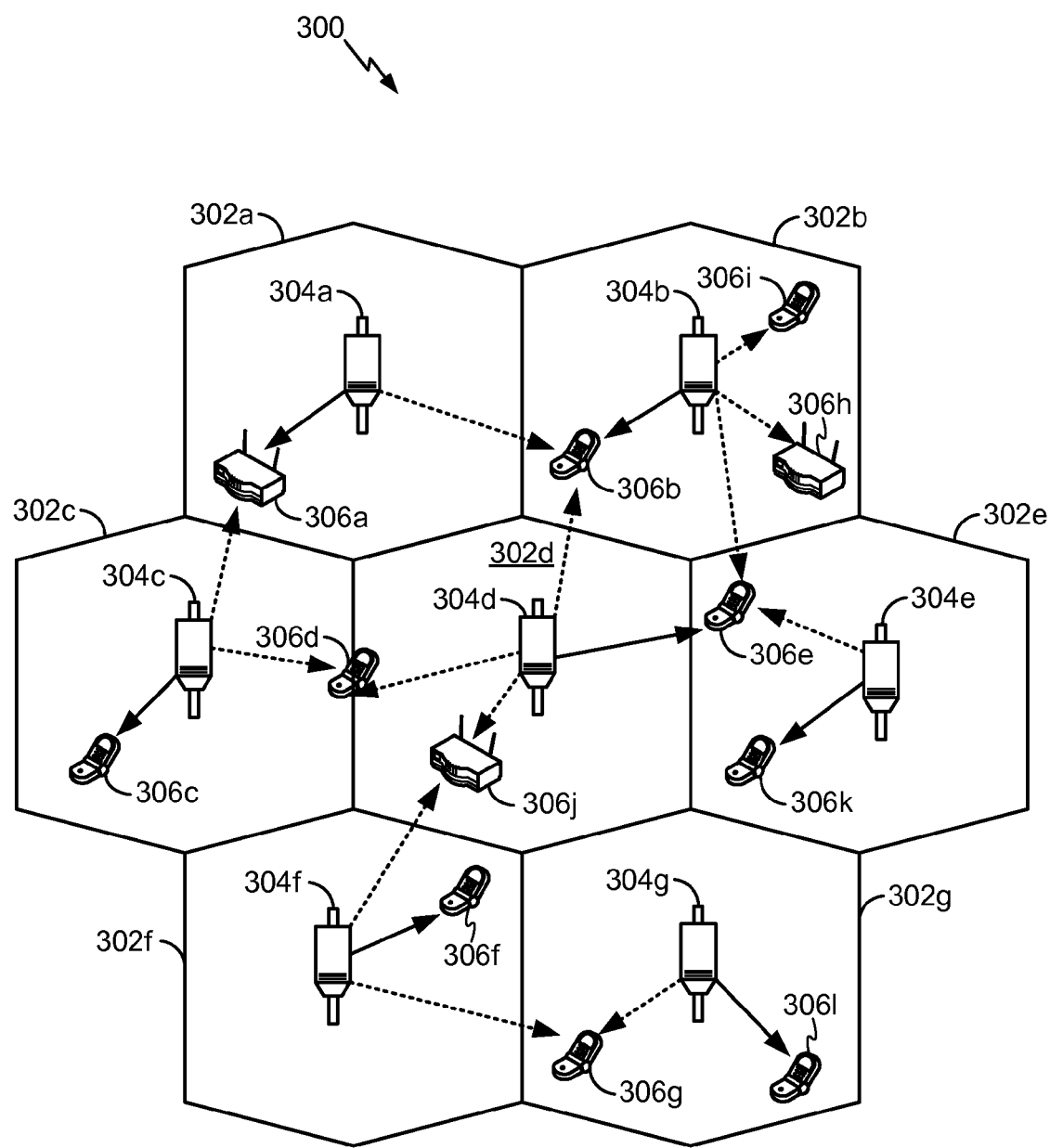
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). An access node may sometime called an e-NodeB (eNB) or more generally, a NodeB. As shown in FIG. 3, mobile entities 306 (e.g., mobile entities 306a-3061) may be dispersed at various locations throughout the system over time. Each mobile entity 306 may communicate with one or more access nodes 304 on a forward link ("FL") and/or a reverse link ("RL) at a given moment, depending upon whether the mobile entity 306 is active and whether it is in soft handoff (if applicable), for example. Soft handoff may also be referred to as soft handover. In soft handoff or soft handover of an access terminal, multiple wireless access points receive and process RL signals from the access terminal. The wireless communication system 300 may provide service over a large geographic region. For example, macro cells 302a-302g may cover a few blocks in an urban or suburban neighborhood or a few square miles in a rural environment.

In accordance with aspects of the embodiments described herein, a mobile entity can report measurements of the last serving cell and/or neighbor cells in one or more networks, such as, for example, LTE, Universal Terrestrial Radio Access Network (UTRAN), GSM EDGE (Enhanced Data rates for GSM Evolution) Radio Access Network (GERAN), and/or CDMA2000 networks. The reported measurements can be used by the network to collect information regarding radio link failures (RLFs) to optimize the deployment and tuning of the network. It is again noted that, while terminology associated with LTE standards, as promulgated under the 3GPP standards, is used herein, the techniques described herein are applicable to other technologies and standards.

Figure 4:
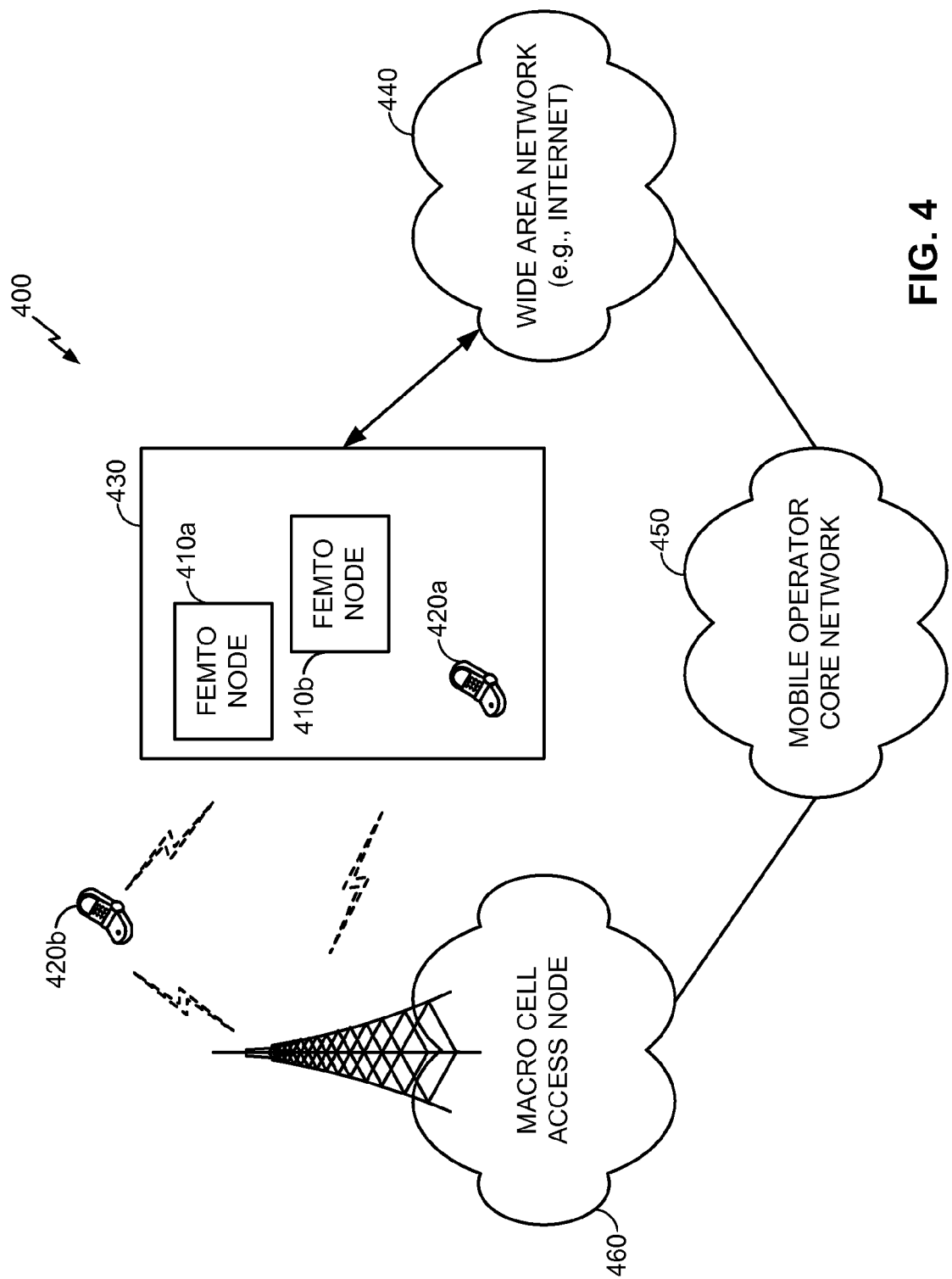
FIG. 4 illustrates an exemplary communication system to enable deployment of femto nodes within a network environment.

FIG. 4 illustrates an exemplary communication system 400 where one or more femto nodes, sometimes called Home NodeBs (HNB's), are deployed within a network environment. Specifically, the system 400 includes multiple femto nodes 410 (e.g., femto nodes 410a and 410b) installed in a relatively small scale network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown). Each femto node 410 may be configured to serve an associated mobile entity 420a and, optionally, an alien mobile entity 420b. In other words, access to femto node(s) 410 may be restricted whereby a given mobile entity 420 may be served by a set of designated (e.g., home) femto nodes but may not be served by any non-designated femto nodes (e.g., a neighbor's femto node).

Figure 5:
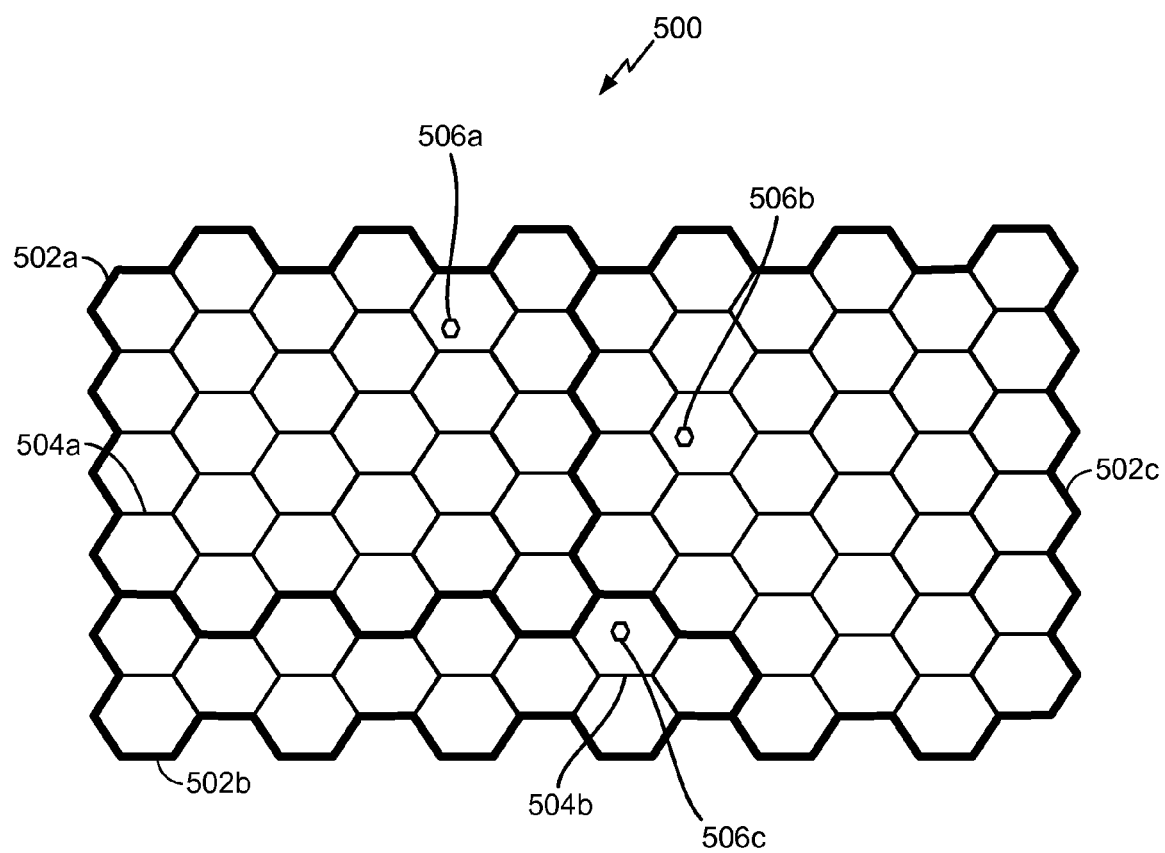
FIG. 5 illustrates an example of a coverage map with several tracking areas defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within the macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Femtocell implementation using HNB's raises new technical issues and challenges that are not as significant in macro cell networks. Such issues and challenges may arise from factors commonly associated with HNB's, for example, user installation instead of installation by trained system technicians, unplanned deployment, restricted association, legacy support limitations and less uniformity in NodeB characteristics. For example, HNB's commonly have unequal common pilot channel (CPICH) transmission power, but such is not typically the case for access nodes used for macro cells. Substantial differences in CPICH transmission power can cause problems during soft handover procedures, causing decoding issues for high-speed dedicated physical control channel (HS-DPCCH) transmissions from mobile entities.

Figure 6:
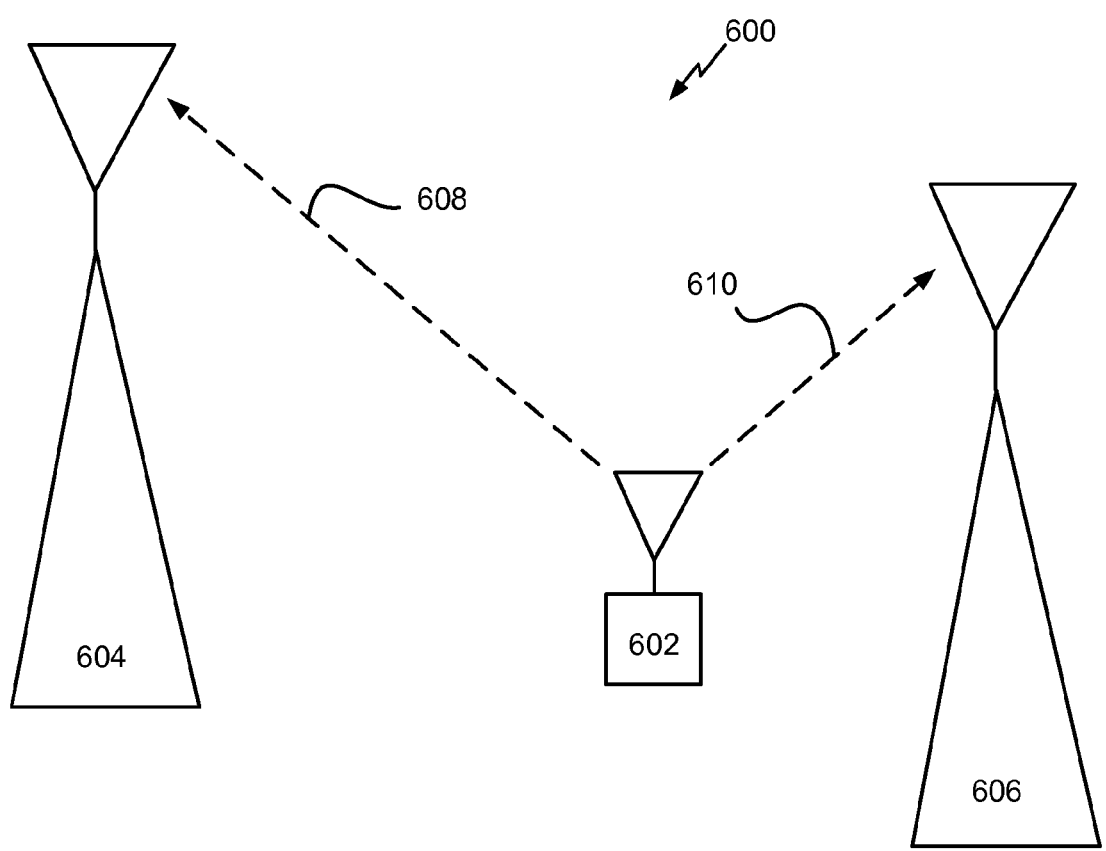
FIG. 6 illustrates an example of a system configuration causing control channel decoding issues during a soft handover.

FIG. 6 presents an example of a circumstance wherein issues may arise with uplink HS-DPCCH during a soft handover procedure, in a system 600 comprising at least two HNB's 604 and 606 and a mobile entity 602. The mobile entity is receiving high-speed download access packet (HS-DPA) service from the serving NodeB 604 that has higher CPICH power and greater path loss 608 to the mobile entity, and in a process of soft handover with the non-serving NodeB 606, which has lower CPICH power and a smaller path loss 610 and is not providing the HSDPA service. During a soft handover, power control at the mobile entity is controlled using an "OR of DOWN" rule that entails the mobile entity reducing transmit power if a transmit power command (TPC) from any of the active nodes is "DOWN." Because of the lower path loss 610, the non-serving NodeB 606 will issue a TPC of DOWN regardless of whether the mobile entity's transmit power is sufficient for reliable reception by the serving NodeB 604. Therefore, the mobile entity transmit power may be unfavorably limited by another access node during a soft handover, causing unreliability in the receiving and decoding of information on the HS-DPCCH, which is received only by the serving NodeB 604.

Embodiments described herein therefore present techniques for improving reliability of HS-DPCCH decoding in soft handover procedures. Although examples and terminology associated with the 3GPP standards are used herein, the techniques described herein may be implemented using other technologies and standards. Several different approaches are described in detail below. These approaches may be used individually, or in any operable combination to resolve communications issues and improve high speed control channel decoding in soft handover procedures. Advantageously, the techniques do not require changes to existing 3GPP standards or the introduction of any new functional blocks.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a method could alternatively be represented as a series of interrelated states or events, such as in a state diagram.

Boosting T2P Power Using Uplink Quality Indicators

One aspect of the present technology may be generally described as directly boosting the traffic-to-pilot (T2P) transmission power of HS-DPCCH transmission, in response to various factors. A general form of the boosted amount for the T2P of HS-DPCCH is given by $$[\text{T2P\_Boost}]_{dB} = Q_1 - Q_2$$

where Q is the uplink quality indicator for a cell, Q1 represents the Q for the HSDPA serving cell, and Q2 represents the minimum Q among all cells in Soft HandOver (SHO) with the mobile. The Q for a cell may be defined as one of the following options (same option for all cells)

$$Q = \begin{cases} \text{Path Loss } (PL), \text{ or} \\ CPICH \text{ power, or} \\ \text{Received Total Wideband Power } (RTWP), \text{ or} \\ \text{Target } RTWP, \text{ or} \\ PL + RTWP, \text{ or} \\ PL + \text{Target } RTWP, \text{ or} \\ CPICH \text{ power} + RTWP, \text{ or} \\ CPICH \text{ power} + \text{Target } RTWP \end{cases}$$

where the path loss is from the mobile to the cell, the RTWP (or equivalently Io, or RoT) is measured at the cell, and the CPICH transmit power and the target RTWP are set by the cell. All the above parameters may be expressed in dB. A smaller Q may indicate a better uplink quality. The indicator Q may be computed at a mobile entity, NodeB, or RNC. In case of an RNC, the RNC may compute Q for each cell based on the information collected from both the mobile and the cell.

In an aspect, the boosted amount may be dynamically determined as a difference between uplink path loss from a mobile entity to the HSDPA serving node and a minimum path loss among all nodes participating in a soft handover. In the alternative, the boosted amount may be fixed as the difference between a CPICH power of the HSDPA serving cell and the minimum CPICH power among all nodes participating in a soft handover.

Figure 7:
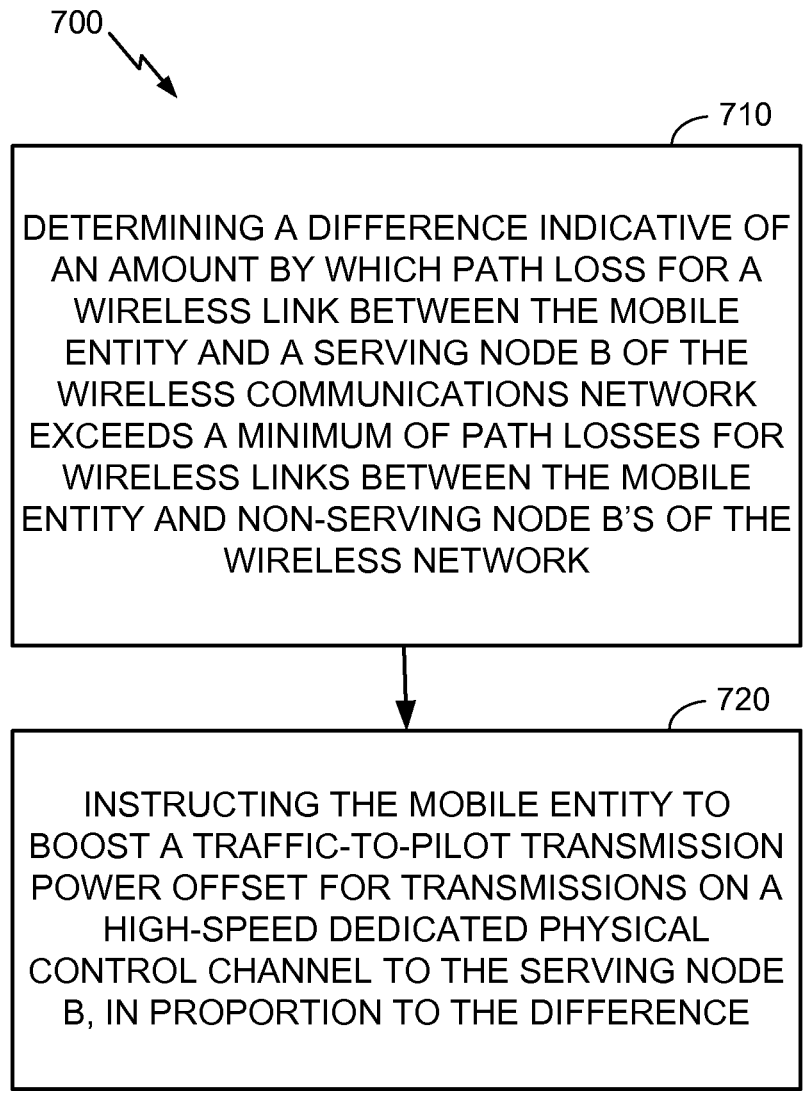
FIG. 7 illustrates an example method for determining a difference at a radio network controller or access node for controlling transmit power of a mobile entity.
Figure 8A:
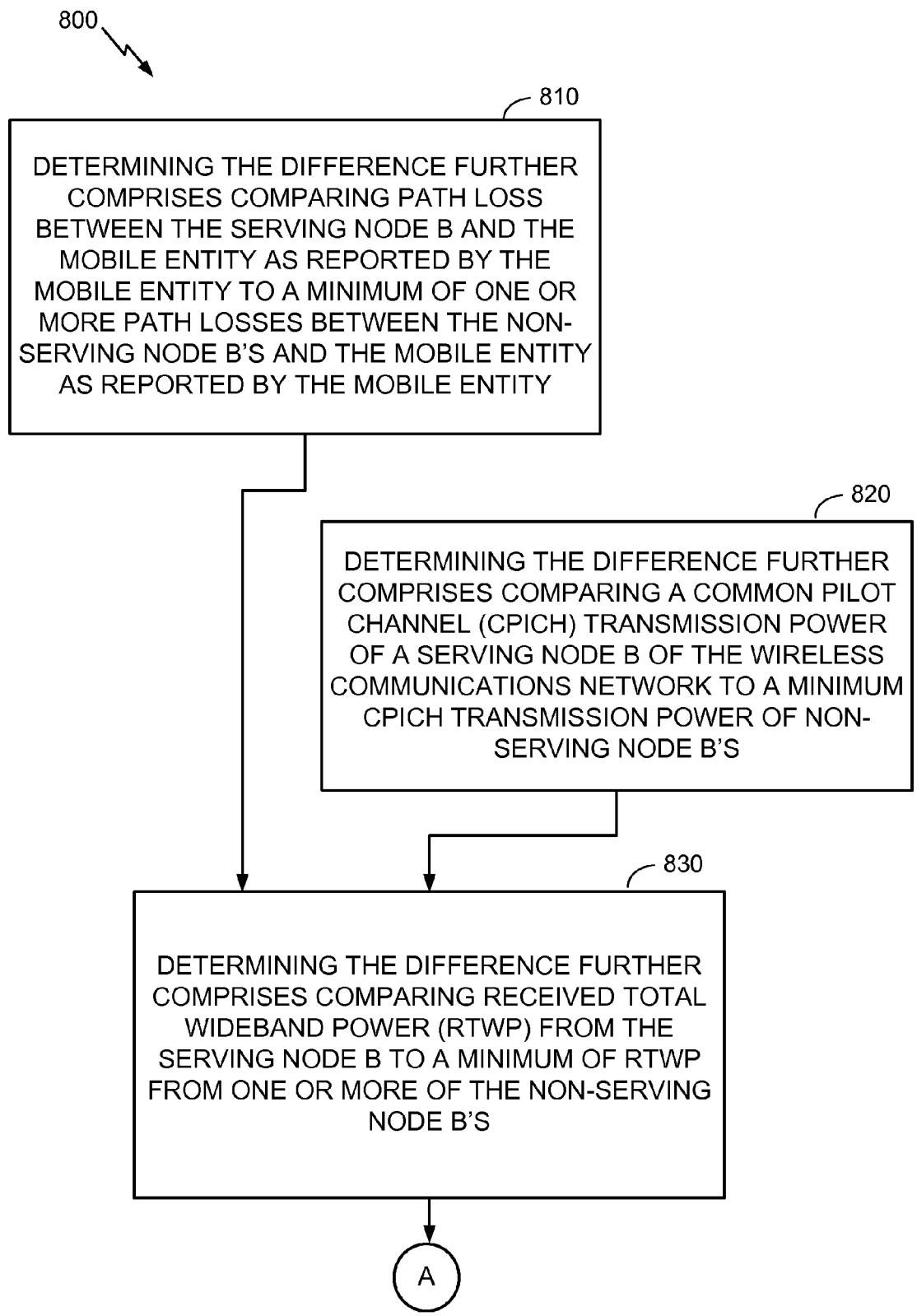
FIGS. 8A, 8B and 8C show further aspects of the method of FIG. 7.

The method 700 shown in FIG. 7 generally encompasses both of the foregoing approaches in determining a difference at a radio network controller or access node for controlling transmit power of a mobile entity, with FIGS. 8A and 8A showing further aspects 800 of the method of FIG. 7. The method 700 may be performed at a wireless communication apparatus, for example a radio network controller (RNC) or access node for controlling a mobile entity (e.g., UE). The method 700 may involve, at 710, determining a difference indicative of an amount by which path loss for a wireless link between the mobile entity and a serving NodeB of the wireless communications network exceeds a minimum of path losses for wireless links between the mobile entity and non-serving NodeBs of the wireless network. The difference may be merely indicative of path loss and not necessarily an actual measurement thereof. For example, the RNC may use system parameters, for example, CPICH transmission power as reported by NodeBs, instead or, or in addition to, actual path loss measurements reported by a mobile entity. The serving NodeB may be, or may include, an HSDPA NodeB. Likewise, the non-serving NodeB may be, or may include, an HSDPA NodeB. Further details and variations concerning determining an indicative difference are disclosed below in connection with FIGS. 8A and 8B.

The method 700 may involve, at 720, instructing the mobile entity to boost a traffic-to-pilot transmission power offset for transmissions on a high-speed dedicated physical control channel to the serving NodeB, in proportion to the difference. Such an instruction, assuming that the offset is correctly determined and the instruction is executed properly, should cause the mobile entity to boost power used for HS-DPCCH transmission to the serving NodeB sufficiently to enable reliable receiving and decoding by the serving NodeB.

Figure 8B:
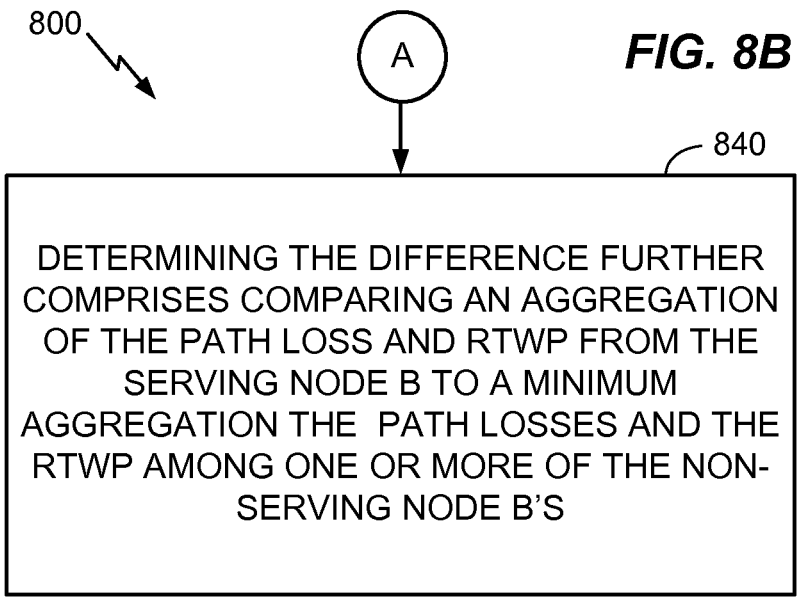
Figure 8C:
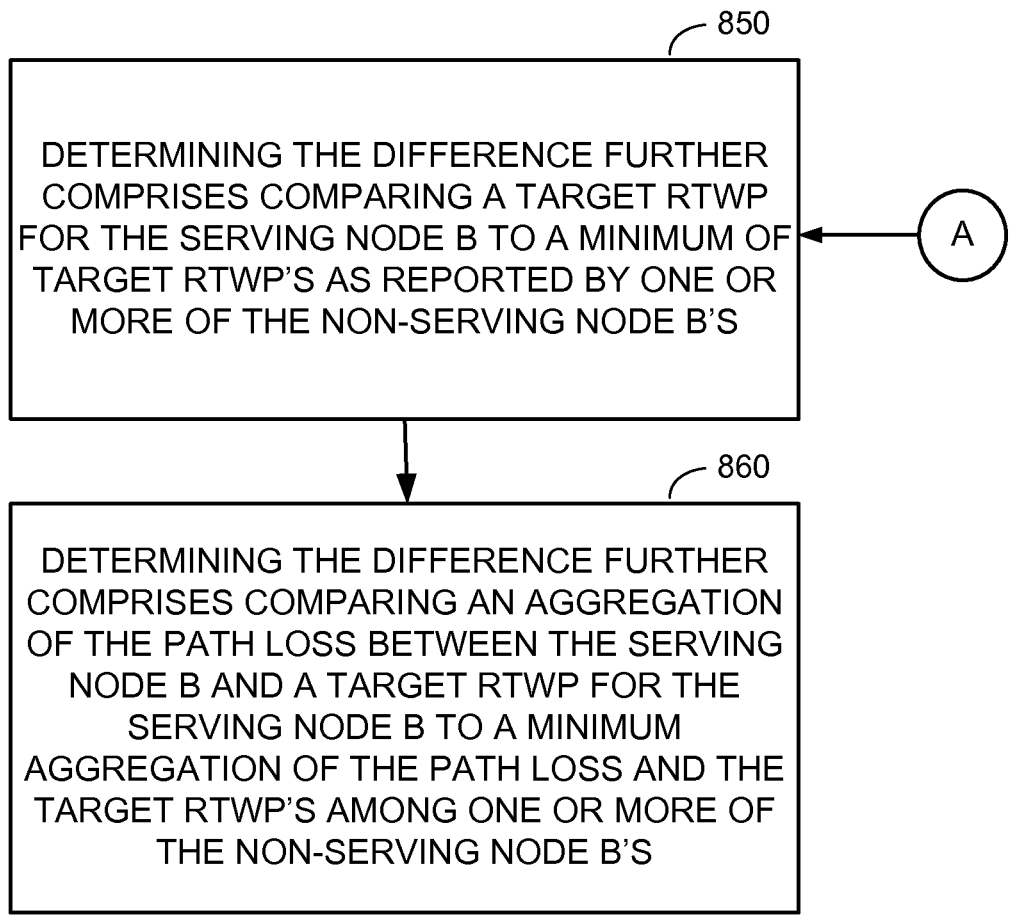

With reference to FIGS. 8A-C, several operations are depicted for determining the difference, which may be performed in the alternative to each other or in any operative combination. In one embodiment shown in FIG. 8A, determining the difference may involve, at 810, comparing path loss between the serving NodeB and the mobile entity to a minimum of one or more path losses between the non-serving NodeBs and the mobile entity. The information indicative of path loss used in the difference determination may be the measured path losses as reported by the mobile entity. In the alternative, or in addition, determining the difference may involve, at 820, comparing a CPICH transmission power of a serving NodeB of the wireless communications network to a minimum CPICH transmission power of non-serving NodeBs. More specifically, the difference may be determined between the CPICH transmission power of the serving NodeB and the minimum CPICH transmission power of all non-serving NodeBs in a soft handover. The CPICH transmission power may be used as a more readily available although possibly inexact proxy for path loss, and thus, may be considered indicative of uplink path loss.

In an embodiment, determining the difference may involve in addition or in the alternative to the foregoing 810 or 820, comparing RTWP from the serving NodeB to a minimum of RTWP from one or more of the non-serving NodeBs, as shown at 830. More specifically, the difference may be determined between the RTWP for the serving NodeB and a minimum RTWP for non-serving nodes capable of participating in the soft handoff procedure.

In the additive case shown in FIG. 8B, determining the difference may involve, at 840, comparing an aggregation of the path loss and RTWP from the serving NodeB to a minimum aggregation of the path losses and the RTWP among one or more of the non-serving NodeBs. An aggregation may include, for example, a sum, a weighted sum, an average, a weighted average, a rolling average, a quotient, or various combinations of these and other numerical aggregations. For further example, in a combination of 820 and 840, determining the difference may include comparing the CPICH transmission power of the serving NodeB aggregated with a RTWP of the serving NodeB, to a minimum aggregation of CPICH transmission power and RTWP among one or more of the non-serving NodeBs as reported by one or more of the non-serving NodeBs. Similarly, determining the difference may include comparing the CPICH transmission power of the serving NodeB aggregated with a target RTWP of the serving NodeB, to a minimum aggregation of CPICH transmission power and target RTWP among one or more of the non-serving NodeBs as reported by one or more of the non-serving NodeBs.

In the alternative, or in addition, and in reference to FIG. 8C, determining the difference may include, at 850, comparing a target RTWP for the serving NodeB to a minimum of target RTWPs as reported by one or more of the non-serving NodeBs. More specifically, the difference may be determined between the target RTWP for the serving NodeB and a minimum of the target RTWPs for non-serving nodes capable of participating in the soft handoff. In the additive case, determining the difference may include, at 860, comparing an aggregation of the path loss between the serving NodeB and a target RTWP for the serving NodeB to a minimum aggregation of the path loss and the target RTWPs among one or more of the non-serving NodeBs. As noted above, aggregation may include various different types of numeric combinations, the details of which may vary depending on system design. The aggregation may be designed to permit a desired degree of influence for the various values described on the difference factors used for power modulation of the mobile entity, as described in connection with FIG. 7 above and FIG. 10 below.

Figure 9:
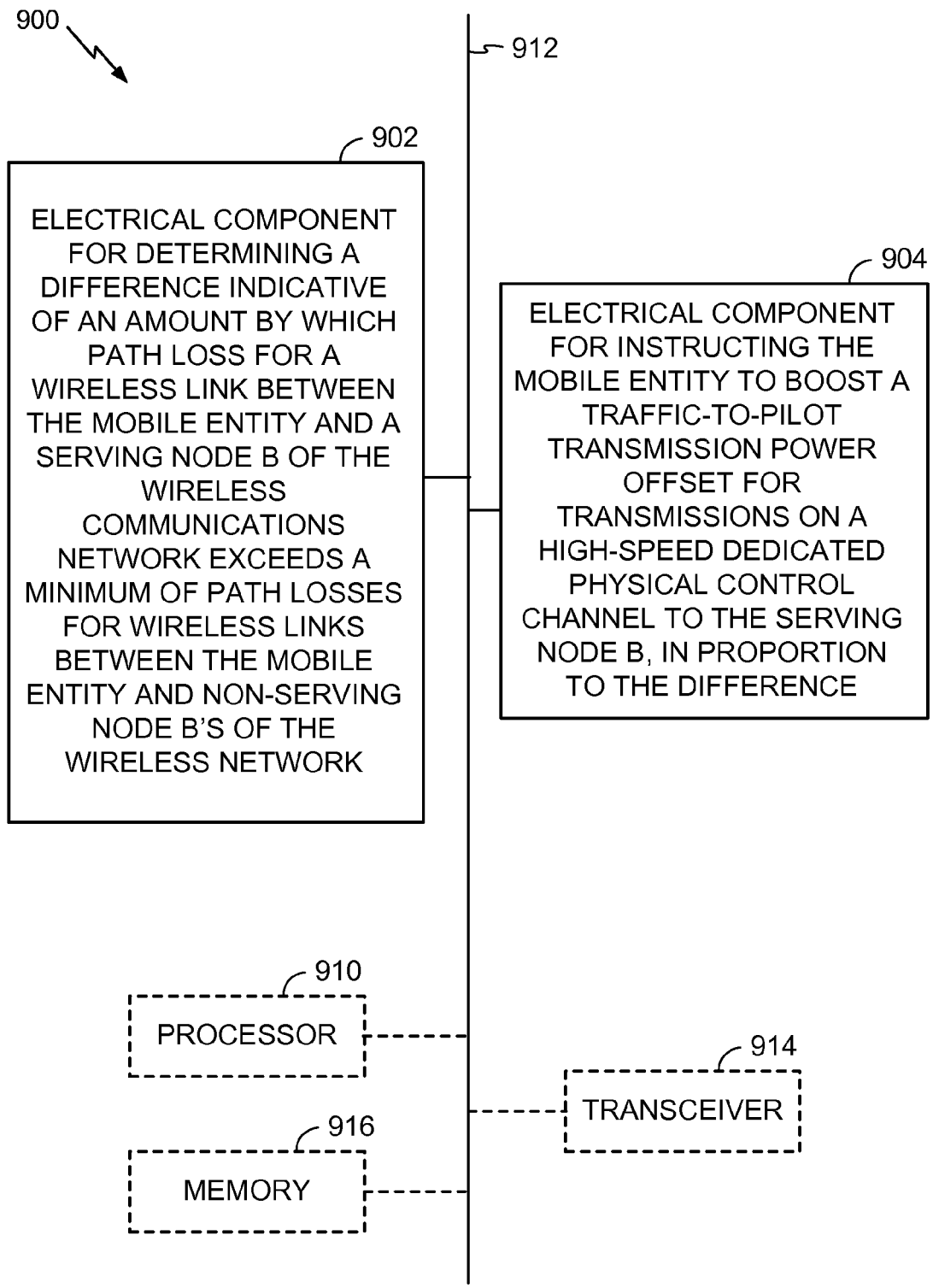
FIG. 9 illustrates an exemplary apparatus for determining a difference at a radio network controller or access node for controlling transmit power of a mobile entity.

With reference to FIG. 9, there is provided an exemplary apparatus 900 that may be configured as an RNC or access node in a wireless network, or as a processor or similar device for use within the controller or node, for determining a difference at a radio network controller or access node for controlling transmit power of a mobile entity. The apparatus 900 may include functional blocks that can represent functions implemented by a processor, software, or combination thereof (e.g., firmware).

As illustrated, in one embodiment, the apparatus 900 may include an electrical component or module 902 for determining a difference indicative of an amount by which path loss for a wireless link between a mobile entity and a serving NodeB of a wireless communications network exceeds a minimum of path losses for wireless links between the mobile entity and non-serving NodeBs of the wireless network. For example, the electrical component 902 may include at least one control processor and a receiver or the like. The component 902 may be, or may include, a means for determining a difference indicative of an amount by which path loss for a wireless link between a mobile entity and a serving NodeB of a wireless communications network exceeds a minimum of path losses for wireless links between the mobile entity and non-serving NodeBs. Said means may include the processor component 910 operating an algorithm. The algorithm may operate in an application to perform the determining, for example, by obtaining measures of the path losses for wireless links between the mobile entity and the non-serving NodeBs, determining a minimum of the measures using a comparison sequence, obtaining a measurement of the path loss for a wireless link between the mobile entity and the serving NodeB, and determining a difference between the minimum and the measure of the path loss using an arithmetic operation.

The apparatus 900 may further include an electrical component 904 for instructing the mobile entity to boost a traffic-to-pilot transmission power offset for transmissions on a high-speed dedicated physical control to the serving NodeB, in proportion to the difference. For example, the electrical component 904 may include at least one control processor coupled to a transmitter or the like. The component 904 may be, or may include, a means for instructing the mobile entity to boost a traffic-to-pilot transmission power offset for transmissions on a high-speed dedicated physical control to the serving NodeB, in proportion to the difference. Said means may include the processor component 910 operating an algorithm. The algorithm may operate in an application to perform the instructing, for example, by calculating an amount by which the mobile entity should boost the traffic-to-pilot transmission power offset in proportion to the difference, generating an instruction specifying the amount, and transmitting the instruction to the mobile entity. The apparatus 900 may include similar electrical components for performing any or all of the additional operations described in connection with FIG. 8, which for illustrative simplicity are not shown in FIG. 9.

In related aspects, the apparatus 900 may optionally include a processor component 910 having at least one processor, in the case of the apparatus 900 configured as a network entity. The processor 910, in such case, may be in operative communication with the components 902-904 or similar components via a bus 912 or similar communication coupling. The processor 910 may effect initiation and scheduling of the processes or functions performed by electrical components 902-904.

In further related aspects, the apparatus 900 may include a radio transceiver component 914. A stand alone receiver and/or stand alone transmitter may be used in lieu of or in conjunction with the transceiver 914. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for effecting the processes and behavior of the components 902-904, and subcomponents thereof, or the processor 910, or the methods disclosed herein. The memory component 916 may retain instructions for executing functions associated with the components 902-904. While shown as being external to the memory 916, it is to be understood that the components 902-904 can exist within the memory 916.

Figure 10:
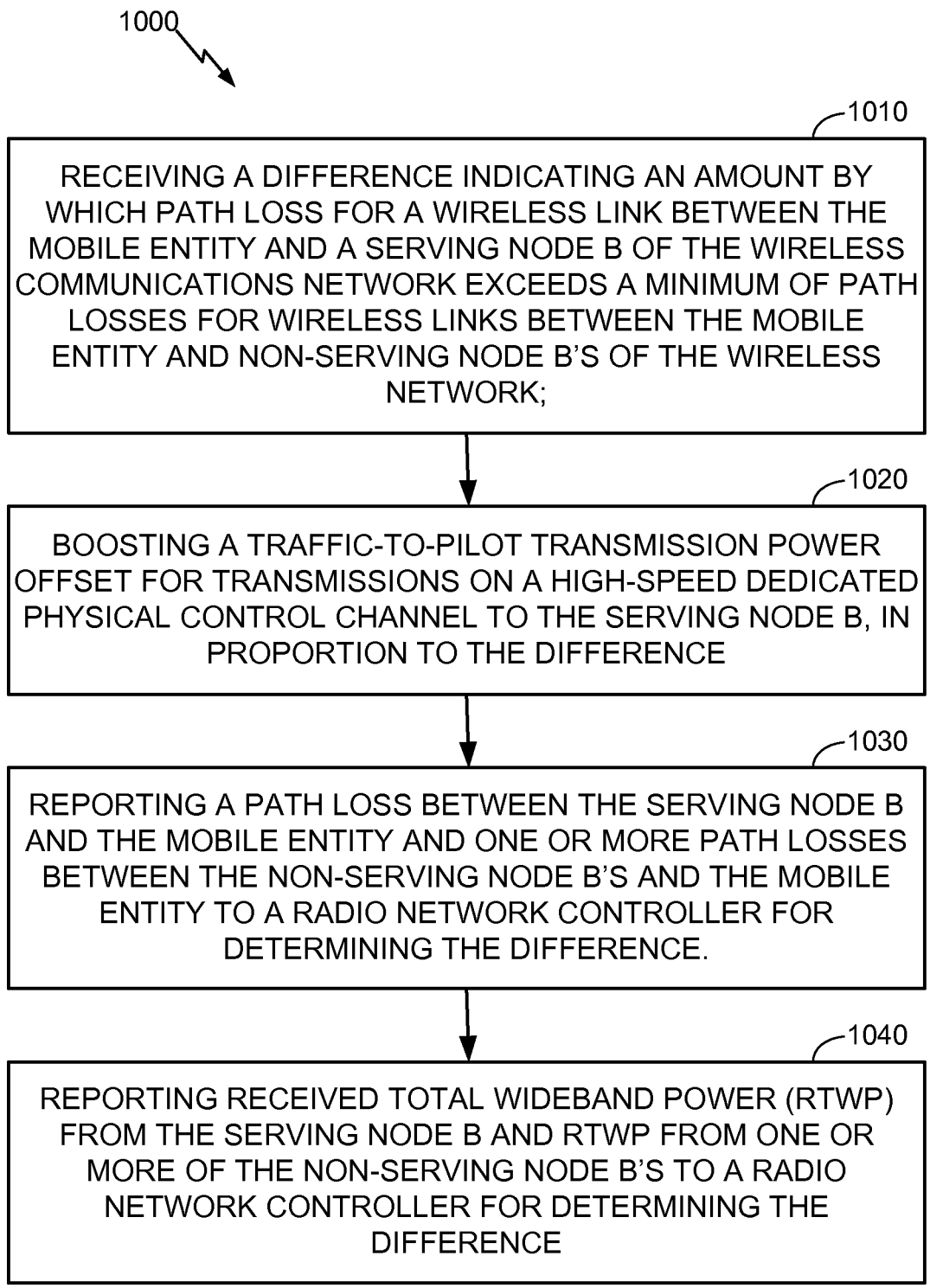
FIG. 10 illustrates an example method for controlling transmit power at a mobile entity in response to a difference parameter.

Referring to FIG. 10, components of an example method 1000 for controlling transmit power at a mobile entity in response to a difference parameter are shown. The method 1000 for performance by a mobile entity may be understood as a counterpart to method 700 for performance by an RNC, NodeB or access node. The method 1000 may include, at 1010, receiving a difference indicating an amount by which path loss for a wireless link between the mobile entity and a serving NodeB of the wireless communications network exceeds a minimum of path losses for wireless links between the mobile entity and non-serving NodeBs of the wireless network. The method 1000 may include, at 1020, boosting a traffic-to-pilot transmission power offset for transmissions on a high-speed dedicated physical control channel to the serving NodeB, in proportion to the difference. This boosting should be designed to compensate, by design of the difference factor or of how the difference factor is applied at the mobile entity, to enable reliable reception at decoding of HS-DPCCH information from the mobile entity at the serving NodeB during a soft handover.

In an aspect, method 1000 may also include, at 1030, reporting a path loss between the serving NodeB and the mobile entity and one or more path losses between the non-serving NodeBs and the mobile entity to a radio network controller or other node. The RNC or other node may use the reported information for determining the difference, which is applied by the mobile entity at 1020. In another aspect, method 1000 may include, at 1040, reporting RTWP from the serving NodeB and RTWP from one or more of the non-serving NodeBs to a radio network controller for determining the difference.

Figure 11:
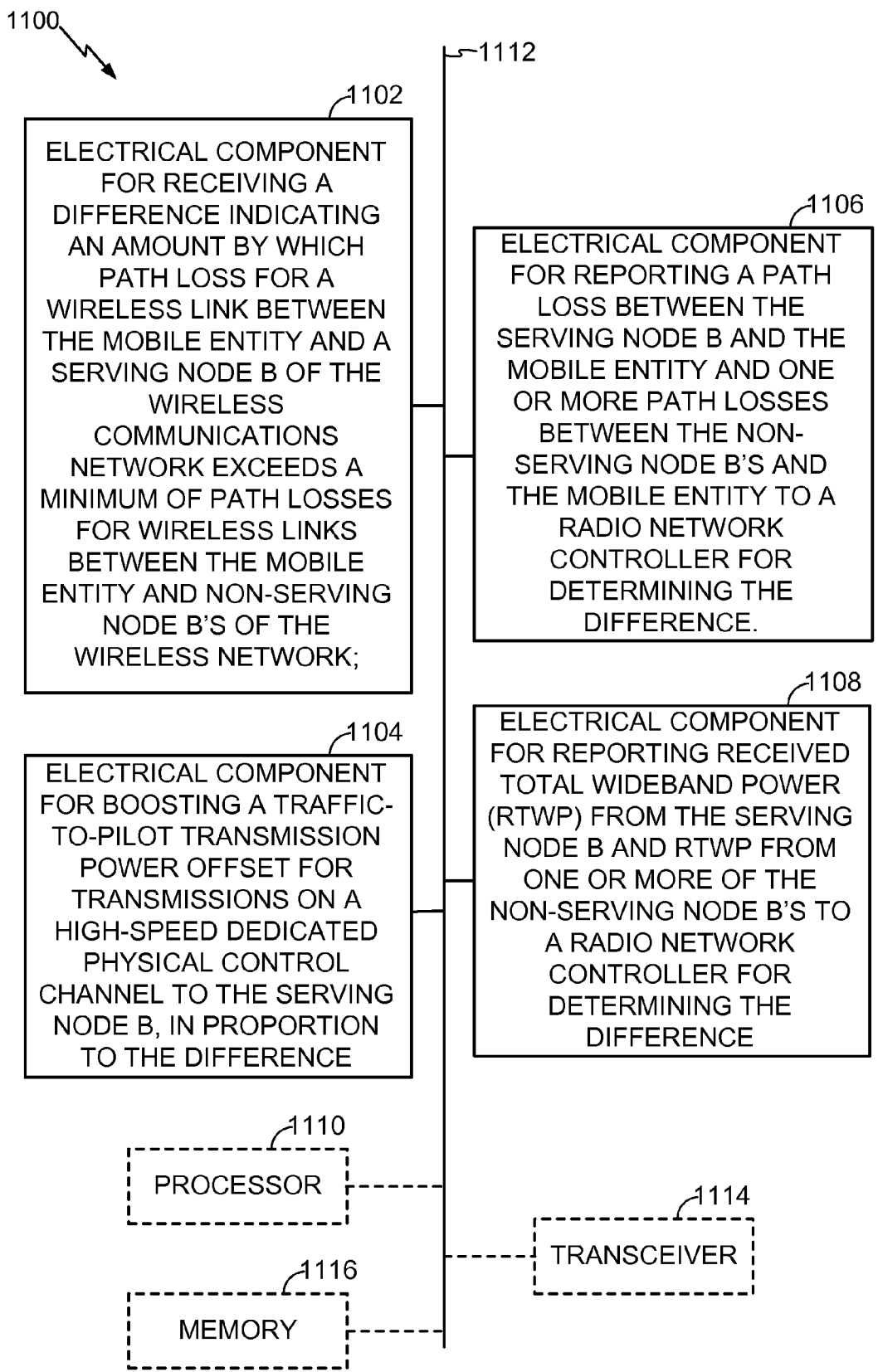
FIG. 11 illustrates an exemplary apparatus for controlling transmit power at a mobile entity in response to a difference parameter.

With reference to FIG. 11, there is provided an exemplary apparatus 1100 that may be configured as a mobile entity (e.g., user equipment or UE) in a wireless network, or as a processor or similar device for use within the mobile entity, for controlling transmit power at a mobile entity in response to a difference parameter. The apparatus 1100 may include functional blocks that can represent functions implemented by a processor, software, or combination thereof (e.g., firmware).

As illustrated, in one embodiment, the apparatus 1100 may include an electrical component or module 1102 for receiving a difference indicating an amount by which path loss for a wireless link between the mobile entity and a serving NodeB of the wireless communications network exceeds a minimum of path losses for wireless links between the mobile entity and non-serving NodeBs of the wireless network. For example, the electrical component 1102 may include at least one control processor and a receiver or the like. The component 1102 may be, or may include, a means for receiving a difference indicating an amount by which path loss for a wireless link between the mobile entity and a serving NodeB of the wireless communications network exceeds a minimum of path losses for wireless links between the mobile entity and non-serving NodeBs. Said means may include the at least one control processor operating an algorithm. The algorithm may operate in an application to perform the receiving, for example, by identifying control channel information in received data, and recognizing the amount in the control channel information.

The apparatus 1100 may include an electrical component 1104 for boosting a traffic-to-pilot transmission power offset for transmissions on a high-speed dedicated physical control channel to the serving NodeB, in proportion to the difference. For example, the electrical component 1104 may include at least one control processor coupled to a transmitter or the like. The component 1104 may be, or may include, a means for boosting a traffic-to-pilot transmission power offset for transmissions on a high-speed dedicated physical control channel to the serving NodeB, in proportion to the difference. Said means may include the at least one control processor operating an algorithm. The algorithm may operate in an application to perform the boosting, for example, by calculating an amplification factor based on the difference amount, and amplifying the traffic-to-pilot transmission power by providing the amplification factor as input to an amplifier.

The apparatus 1100 may include an electrical component 1106 for reporting a path loss between the serving NodeB and the mobile entity and one or more path losses between the non-serving NodeBs and the mobile entity to a radio network controller for determining the difference. The component 1106 may be, or may include, a means for reporting a path loss between the serving NodeB and the mobile entity and one or more path losses between the non-serving NodeBs and the mobile entity to a radio network controller for determining the difference. Said means may include the at least one control processor operating an algorithm. The algorithm may operate in an application to perform the reporting, for example, by measuring respective path losses of forward links from the serving NodeB and from at least one non-serving NodeB, and transmitting values indicative of the respective path losses to the radio network controller.

In the alternative, or in addition, the apparatus 1100 may include an electrical component 1108 for reporting RTWP from the serving NodeB and RTWP from one or more of the non-serving NodeBs to a radio network controller for determining the difference. The component 1108 may be, or may include, a means for reporting RTWP from the serving NodeB and RTWP from one or more of the non-serving NodeBs to a radio network controller. Said means may include the at least one control processor operating an algorithm. The algorithm may operate in an application to perform the reporting, for example, by measuring respective RTWP of reverse links a the serving NodeB and at at least one non-serving NodeB, and providing values indicative of the respective RTWP of reverse links to the radio network controller.

In related aspects, the apparatus 1100 may optionally include a processor component 1110 having at least one processor, in the case of the apparatus 1100 configured as a network entity. The processor 1110, in such case, may be in operative communication with the components 1102-1108 or similar components via a bus 1112 or similar communication coupling. The processor 1110 may initiate and schedule the processes or functions performed by electrical components 1102-1108.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1108, and subcomponents thereof, or the processor 1110, or the methods disclosed herein. The memory component 1116 may retain instructions for executing functions associated with the components 1102-1108.

While shown as being external to the memory 1116, it is to be understood that the components 1102-1108 can exist within the memory 1116.

Adding Attenuation of UL at Non-HSDPA Serving Nodes

Another technique for improving HS-DPCCH decoding during soft handovers may be summarized as adding attenuation of the uplink transmission signal at non-HSDPA serving nodes. This method attempts to equalize the uplink quality of each cell by adding additional attenuation at non-HSDPA serving cells. The additional attenuation at each non-HSDPA serving cell in Soft HandOver (SHO) can be computed as $$[\text{Atten}]_{dB} = \max(0, Q_1 - Q_3)$$

where Q is the uplink quality indicator for a cell, Q1 represents the Q for the HSDPA serving cell, and Q3 represents the Q for the cell applying attenuation. The Q for a cell is defined as one of the following options (same option for all cells)

$$Q = \begin{cases} \text{Path Loss } (PL), \text{ or} \\ CPICH \text{ power, or} \\ \text{Received Total Wideband Power } (RTWP), \text{ or} \\ \text{Target } RTWP, \text{ or} \\ PL + RTWP, \text{ or} \\ PL + \text{Target } RTWP, \text{ or} \\ CPICH \text{ power} + RTWP, \text{ or} \\ CPICH \text{ power} + \text{Target } RTWP \end{cases}$$

where the path loss is from the mobile to the cell, the RTWP (or equivalently Io, or RoT) is measured at the cell, and the CPICH transmit power and the target RTWP are set by the cell. All the above parameters are in dB. A smaller Q may indicate a better uplink quality. The indicator may be computed at a mobile entity, NodeB, or RNC. In case of an RNC, the RNC may compute Q for each cell based on the information collected from both the mobile and the cell. The computed additional attenuation may be applied via attenuator hardware attenuating uplink received signals, e.g. at antenna port. Alternatively, the additional attenuation may be applied by modifying the estimated interference plus noise in the uplink power control algorithm only for the corresponding user, according to the relations $$\tilde{N}t = \hat{N}t + V$$

$$V = ([No]_{dBm} + [\text{Atten}]_{dB})_{linear} - No$$

where $\hat{N}t$ is the original estimated interference plus noise for the corresponding user in uplink, $\tilde{N}t$ is the modified estimated interference plus noise for the corresponding user, No is the noise floor at the non-serving node applying attenuation, and $[\text{Atten}]_{dB}$ is as computed before. Note that unlike the application via attenuator hardware, the application by modifying $\hat{N}t$ can be user specific and, therefore, no attenuation need be applied to nodes that are not experiencing the HS-DPCCH decoding issue.

In an aspect, this approach may be designed to equalize an effective path loss (PL) to each node involved in a soft handover by adding the additional attenuation at non-HSDPA serving nodes, and not at the serving node. For example, the additional attenuation at each non-HSDPA serving node in soft handover may be computed as $$[\text{Atten}]_{dB} = \max(0, \text{HSDPA\_Serving\_Cell\_CPICH\_Power\_dBm} - \text{Own\_Cell\_CPICH\_Power\_dBm}). \quad (1)$$

The additional attenuation may be applied either via attenuator hardware or by modifying the estimated interference plus noise in an uplink power control algorithm for the corresponding user, according to the relations $$\tilde{N}t = \hat{N}t + V$$

$$V = ([No]_{dBm} + [\text{Atten}]_{dB})_{linear} - No \quad (2)$$

where $\hat{N}t$ is the original estimated interference plus noise, No is the noise floor at the non-serving cell, and $[\text{Atten}]_{dB}$ is obtained from (1). Note that unlike the application via attenuator hardware, the application by (2) can be user specific and, therefore, no attenuation need be applied to nodes that are not experiencing the HS-DPCCH decoding issue.

Figure 12:
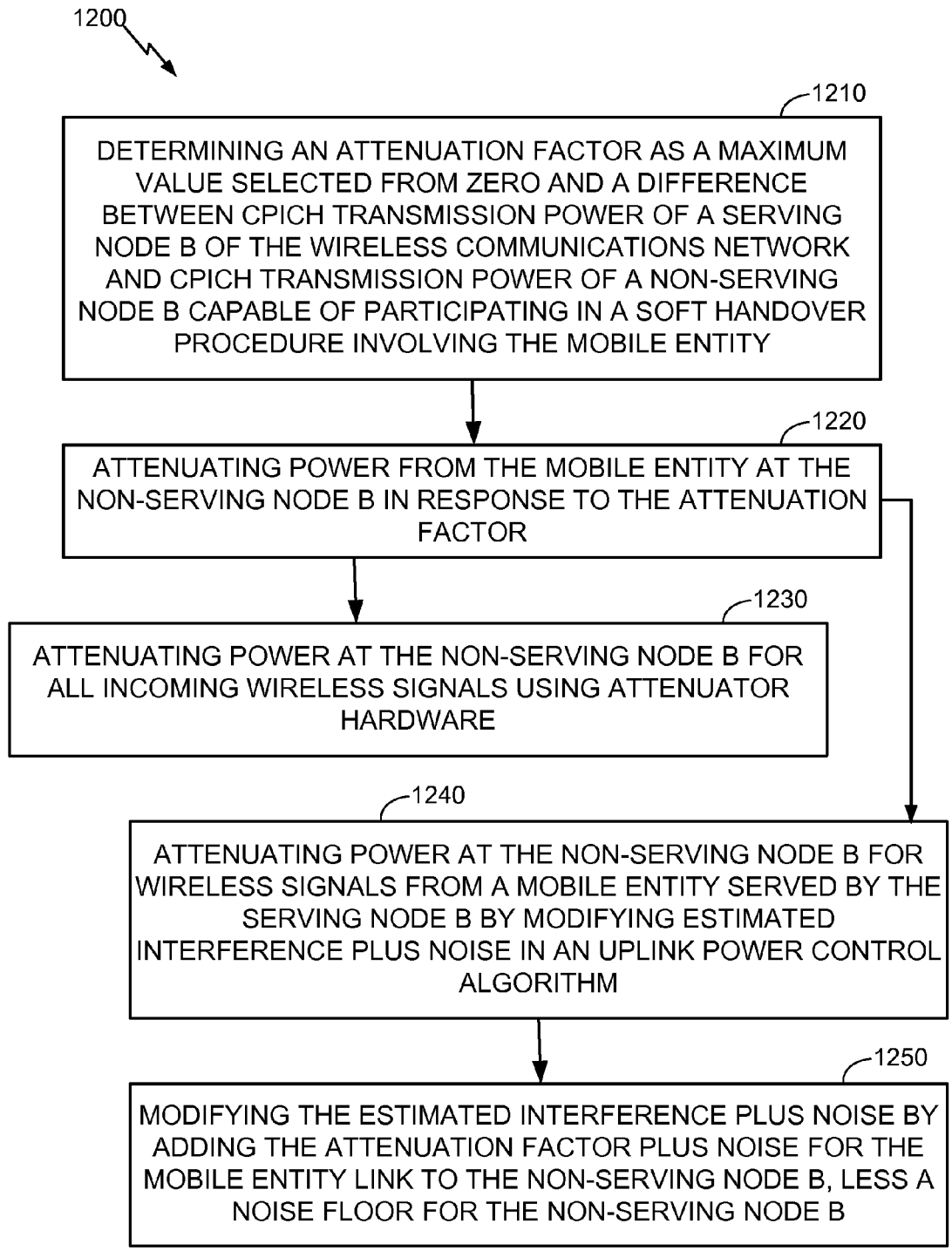
FIG. 12 illustrates an example method for controlling transmit power of a mobile entity using control of attenuation at a non-serving NodeB.

In accordance with the foregoing, FIG. 12 illustrates an example method 1200 for controlling transmit power of a mobile entity using control of attenuation at a non-serving NodeB. The method 1200 may include, at 1210, determining an attenuation factor as a maximum value selected from zero and a difference between CPICH transmission power of a serving NodeB of the wireless communications network and CPICH transmission power of a non-serving NodeB capable of participating in a soft handover procedure involving the mobile entity. The method 1200 may include attenuating power from the mobile entity at the non-serving NodeB in response to the attenuation factor.

In an aspect, the method 1200 may include attenuating power at the non-serving NodeB indiscriminately for all incoming wireless signals, using attenuator hardware, as shown at 1230. In an alternative aspect, the method 1200 may include, at 1240, attenuating power at the non-serving NodeB is performed for wireless signals from a mobile entity served by the serving NodeB by modifying estimated interference plus noise in an uplink power control algorithm. In the latter case, the method may also include, at 1250, modifying the estimated interference plus noise by adding the attenuation factor plus noise for the mobile entity link to the non-serving NodeB, less a noise floor for the non-serving NodeB.

Figure 13:
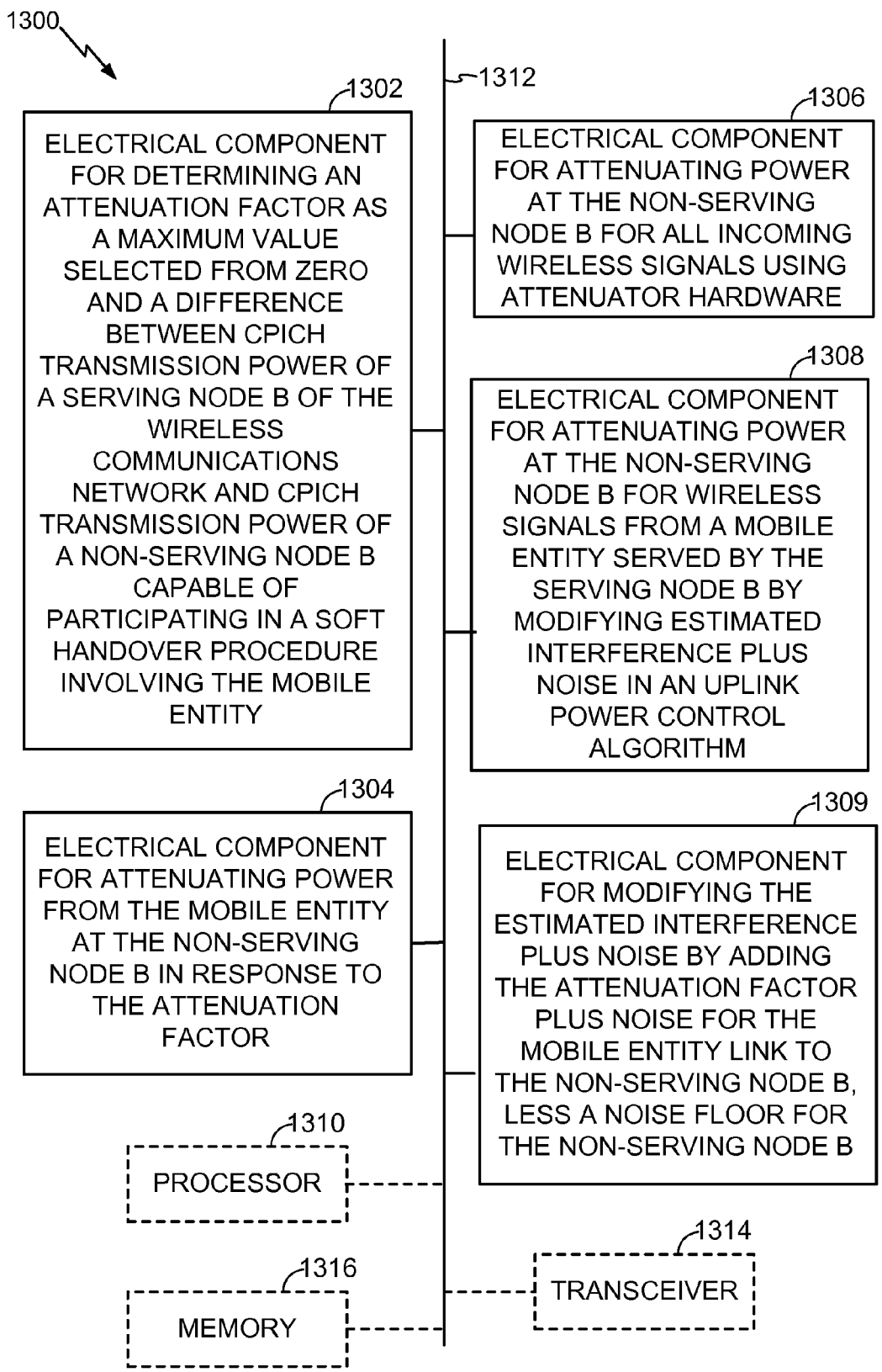
FIG. 13 illustrates an exemplary apparatus for controlling transmit power of a mobile entity using control of attenuation at a non-serving NodeB.

With reference to FIG. 13, there is provided an exemplary apparatus 1300 that may be configured as an access node in a wireless network, or as a processor or similar device for use within the access node, for controlling transmit power of a mobile entity using control of attenuation at a non-serving NodeB. The apparatus 1300 may include functional blocks that can represent functions implemented by a processor, software, or combination thereof (e.g., firmware).

As illustrated, in one embodiment, the apparatus 1300 may include an electrical component or module 1302 for determining an attenuation factor as a maximum value selected from zero and a difference between CPICH transmission power of a serving NodeB of the wireless communications network and CPICH transmission power of a non-serving NodeB capable of participating in a soft handover procedure involving the mobile entity. For example, the electrical component 1302 may include at least one control processor, or the like. The component 1302 may be, or may include, a means for determining an attenuation factor as a maximum value selected from zero and a difference between CPICH transmission power of a serving NodeB of the wireless communications network and CPICH transmission power of a non-serving NodeB capable of participating in a soft handover procedure involving the mobile entity. Said means may include the at least one control processor operating an algorithm. The algorithm may operate in an application to perform the determining, for example, by identifying (or self-identifying itself as) a non-serving NodeB capable of participating in a soft handover procedure involving the mobile entity, obtaining a measurement of CPICH transmission power of a serving NodeB of the wireless communications network and CPICH transmission power of the non-serving NodeB, determining the difference using an arithmetic operation, and selecting a maximum of zero or the difference using a comparison operation.

The apparatus 1300 may include an electrical component 1304 for attenuating power from the mobile entity at the non-serving NodeB in response to the attenuation factor. For example, the electrical component 1304 may include at least one control processor coupled to a receiver, or antenna hardware. The component 1304 may be, or may include, a means for attenuating power from the mobile entity at the non-serving NodeB in response to the attenuation factor. Said means may include the at least one control processor operating an algorithm. The algorithm may operate in an application to perform the attentuating, for example, by receiving a signal from the mobile entity, and attenuating the signal in an amount determined at least partly by the attenuation factor.

The apparatus 1300 may include an electrical component 1306 for attenuating power at the non-serving NodeB for all incoming wireless signals using attenuator hardware. The component 1306 may be, or may include, a means for attenuating power from the mobile entity at the non-serving NodeB for all incoming wireless signals using attenuator hardware. Said means may include a receiver coupled to attenuator hardware, such that all signals received by the receiver pass through the attenuator hardware.

In the alternative, the apparatus 1300 may include an electrical component 1308 for attenuating power at the non-serving NodeB for wireless signals from a mobile entity served by the serving NodeB by modifying estimated interference plus noise in an uplink power control algorithm. The component 1308 may be, or may include, a means for attenuating power from the mobile entity at the non-serving NodeB. Said means may include at least one control processor operating an algorithm. The algorithm may operate in an application to perform the attenuating, by modifying estimated interference plus noise in an uplink power control algorithm. In this case, the apparatus 1300 may include an electrical component or means 1309 for modifying the estimated interference plus noise by adding the attenuation factor plus noise for the mobile entity link to the non-serving NodeB, less a noise floor for the non-serving NodeB.

In related aspects, the apparatus 1300 may optionally include a processor component 1310 having at least one processor, in the case of the apparatus 1300 configured as a network entity. The processor 1310, in such case, may be in operative communication with the components 1302-1309 or similar components via a bus 1312 or similar communication coupling. The processor 1310 may initiate and schedule the processes or functions performed by electrical components 1302-1309.

In further related aspects, the apparatus 1300 may include a radio transceiver component 1314. A stand alone receiver and/or stand alone transmitter may be used in lieu of or in conjunction with the transceiver 1314. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for effecting the processes and behavior of the components 1302-1309, and subcomponents thereof, or the processor 1310, or the methods disclosed herein. The memory component 1316 may retain instructions for executing functions associated with the components 1302-1309. While shown as being external to the memory 1316, it is to be understood that the components 1302-1308 can exist within the memory 1316.

Setting SIR Targets at Non-HSDPA Nodes

Another distinct technique for improving HS-DPCCH decoding during soft handovers may be summarized as setting separate and higher signal-to-interference (SIR) targets at non-HSDPA serving nodes. This technique may be designed to increase the mobile entity transmission power by maintaining a separate SIR target (i.e., outer-loop power control set-point) for each node in the active set and increasing the SIR target for each non-HSDPA serving node in a soft handoff. For example, the serving RNC controlling the soft handoff may increase the SIR target for each non-HSDPA serving node participating in the soft handoff by a certain amount. A general expression of this extra amount may be given by $$[\Delta SIR\_Target]_{dB} = \max(0, Q_1 - Q_4)$$

where Q is the uplink quality indicator for a cell, Q1 represents the Q for the HSDPA serving cell, and Q4 represents the Q for the cell increasing the SIR target. The Q for a cell is defined as one of the following options (same option for all cells)

$$Q = \begin{cases} \text{Path Loss } (PL), \text{ or} \\ CPICH \text{ power, or} \\ \text{Received Total Wideband Power } (RTWP), \text{ or} \\ \text{Target } RTWP, \text{ or} \\ PL + RTWP, \text{ or} \\ PL + \text{Target } RTWP, \text{ or} \\ CPICH \text{ power} + RTWP, \text{ or} \\ CPICH \text{ power} + \text{Target } RTWP \end{cases}$$

where the path loss is from the mobile to the cell, the RTWP (or equivalently Io, or RoT) is measured at the cell, and the CPICH transmit power and the target RTWP are set by the cell. All the above parameters may be in dB. A smaller Q may indicate a better uplink quality. The indicator may be computed at a mobile entity, NodeB, or RNC. In case of an RNC, the RNC may compute Q for each cell based on the information collected from both the mobile and the cell.

Figure 14:
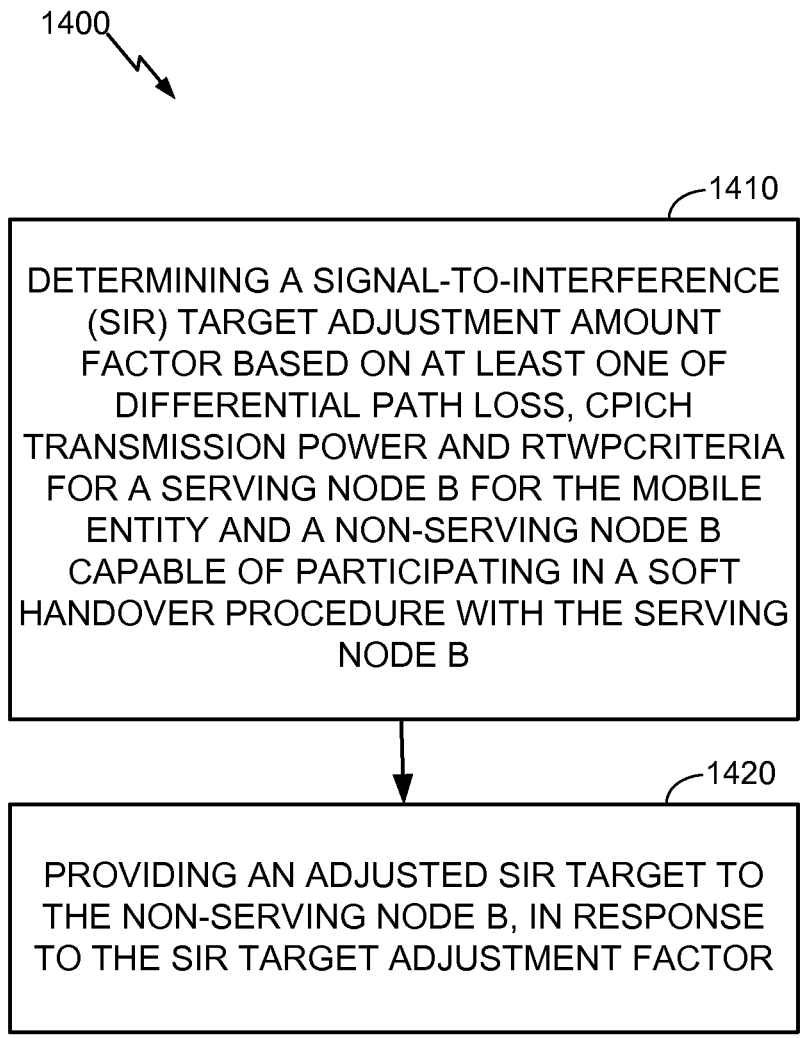
FIG. 14 illustrates an example method for providing an adjusted signal-to-interference (SIR) target from a radio access controller or access node to a non-serving NodeB for controlling transmit power of a mobile entity.

Consistent with the forgoing, FIG. 14 illustrates an example method 1400 for providing an adjusted SIR target from a radio access controller or access node to a non-serving NodeB for controlling transmit power of a mobile entity. The method 1400 may include, at 1410, determining a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. The method 1400 may include, at 1420, providing an adjusted SIR target to the non-serving NodeB, in response to the SIR target adjustment factor.

Figure 15:
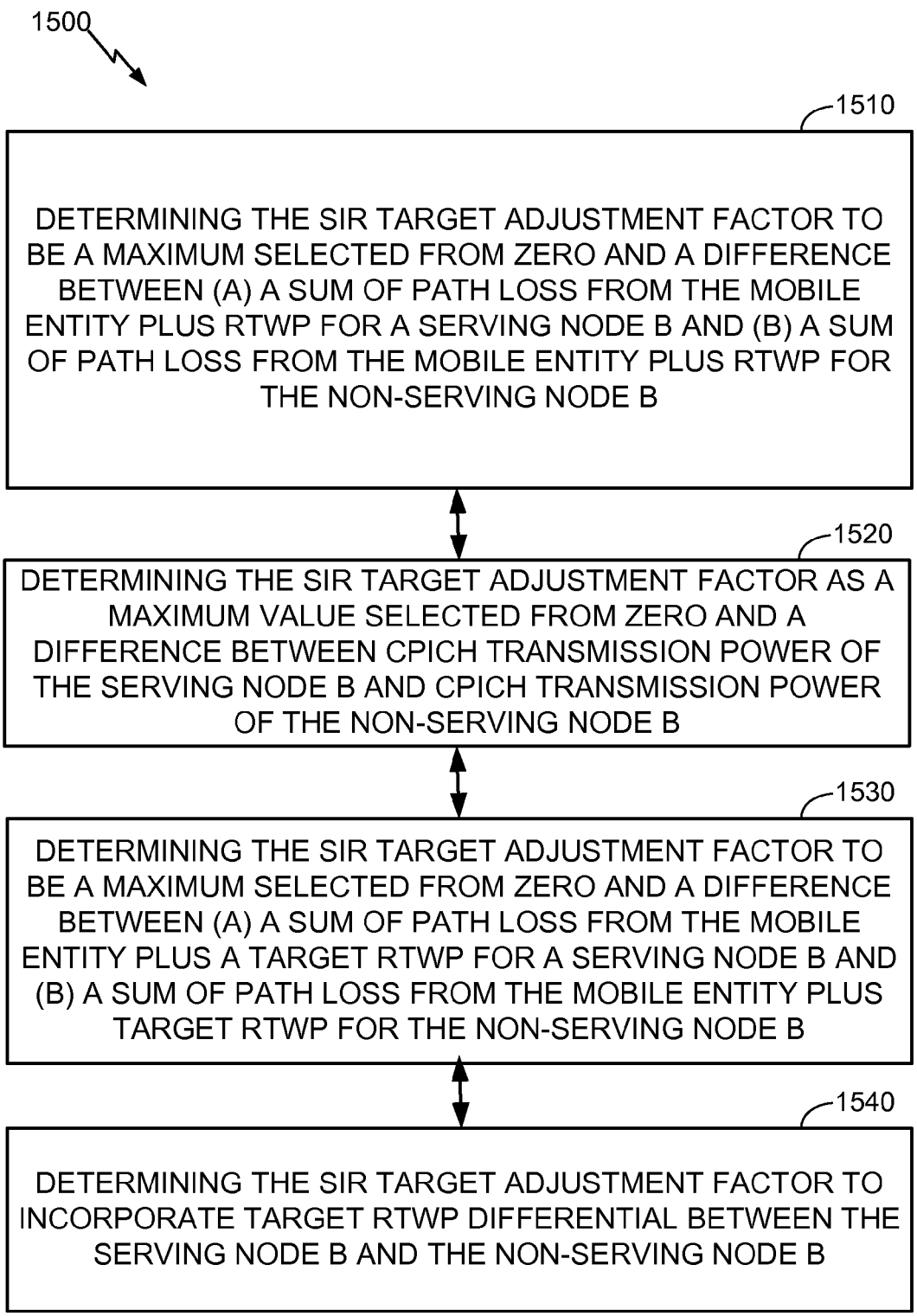
FIG. 15 shows further aspects of the method of FIG. 14.

FIG. 15 shows further aspects 1500 of the method 1400. As indicated by the double arrows connecting the respective blocks, each block is independent of the others. Therefore, the method 1400 may include any or all of the blocks 1500, in any operative order. At 1510, the method 1400 may further include determining the SIR target adjustment factor to be a maximum selected from zero and a difference between (a) a sum of path loss from the mobile entity plus RTWP for a serving NodeB of the wireless communications network and (b) a sum of path loss from the mobile entity plus RTWP for the non-serving NodeB. The method 1400 may further include, at 1520, determining the SIR target adjustment factor as a maximum value selected from zero and a difference between CPICH transmission power of the serving NodeB and CPICH transmission power of the non-serving NodeB. The method 1400 may further include, at 1530, determining the SIR target adjustment factor to be a maximum selected from zero and a difference between (a) a sum of path loss from the mobile entity plus a target RTWP for a serving NodeB and (b) a sum of path loss from the mobile entity plus target RTWP for the non-serving NodeB. The method 1400 may further include, at 1540, determining the SIR target adjustment factor to incorporate a target RTWP differential between the serving NodeB and the non-serving NodeB.

Figure 16:
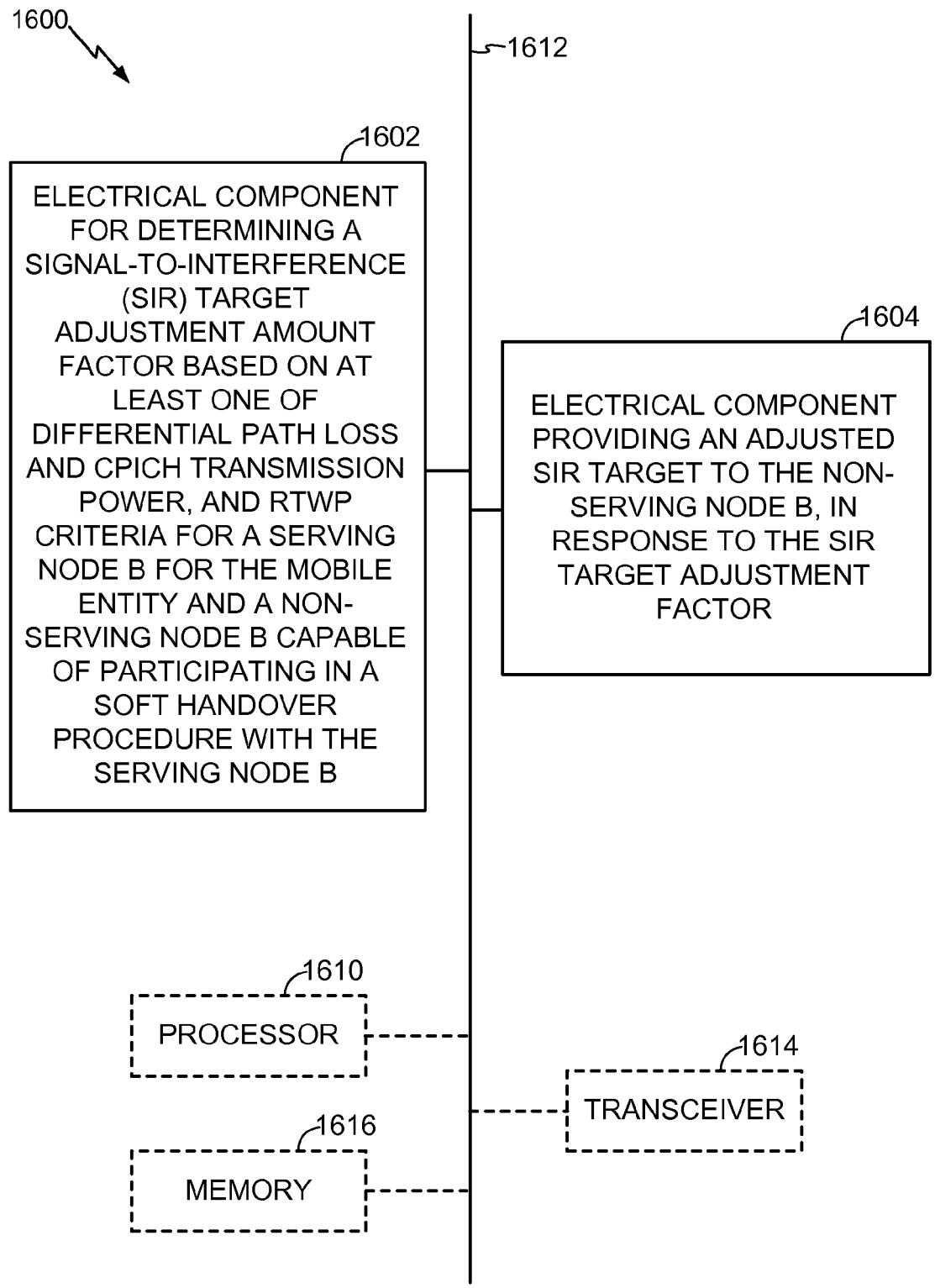
FIG. 16 illustrates an exemplary apparatus for providing an adjusted SIR target from a radio access controller or access node to a non-serving NodeB for controlling transmit power of a mobile entity.

With reference to FIG. 16, there is provided an exemplary apparatus 1600 that may be configured as an access node in a wireless network, or as a processor or similar device for use within the access node, for providing an adjusted SIR target from a radio access controller or access node to a non-serving NodeB for controlling transmit power of a mobile entity. The apparatus 1600 may include functional blocks that can represent functions implemented by a processor, software, or combination thereof (e.g., firmware).

In one embodiment, the apparatus 1600 may include an electrical component or module 1602 for determining a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. For example, the electrical component 1602 may include at least one control processor, or the like, coupled to a receiver. The component 1602 may be, or may include, a means for determining a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. Said means may include at least one control processor operating an algorithm. The algorithm may operate in an application to perform the determining, for example by obtaining respective measures of path losses for a serving NodeB and a non-serving NodeB and/or respective measures of power criteria for the nodes, calculating a difference of the respective measures using an arithmetic operation, and calculating a SIR target adjustment amount using a predetermined numerical relationship between the differential path loss and/or power criteria and a SIR target or SIR target differential.

The apparatus 1600 may include an electrical component 1604 for providing an adjusted SIR target to the non-serving NodeB, in response to the SIR target adjustment factor. For example, the electrical component 1604 may include at least one control processor coupled to a transmitter. The component 1604 may be, or may include, a means for providing an adjusted SIR target to the non-serving NodeB, in response to the SIR target adjustment factor. Said means may include at least one control processor operating an algorithm. The algorithm may operate in an application to perform the providing, for example by retrieving a stored SIR target, operating on the stored SIR target to obtain an adjusted SIR target using the SIR target adjustment factor, and sending the adjusted SIR target to the non-serving NodeB. The apparatus 1600 may include similar electrical components for performing any or all of the additional operations described in connection with FIG. 15, which for illustrative simplicity are not shown in FIG. 16.

In related aspects, the apparatus 1600 may optionally include a processor component 1610 having at least one processor, in the case of the apparatus 1600 configured as a network entity. The processor 1610, in such case, may be in operative communication with the components 1602-1604 or similar components via a bus 1612 or similar communication coupling. The processor 1610 may initiate and schedule the processes or functions performed by electrical components 1602-1604.

In further related aspects, the apparatus 1600 may include a radio transceiver component 1614. A stand alone receiver and/or stand alone transmitter may be used in lieu of or in conjunction with the transceiver 1614. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for effecting the processes and behavior of the components 1602-1604, and subcomponents thereof, or the processor 1610, or the methods disclosed herein. The memory component 1616 may retain instructions for executing functions associated with the components 1602-1604. While shown as being external to the memory 1616, it is to be understood that the components 1602-1608 can exist within the memory 1616.

Figure 17:
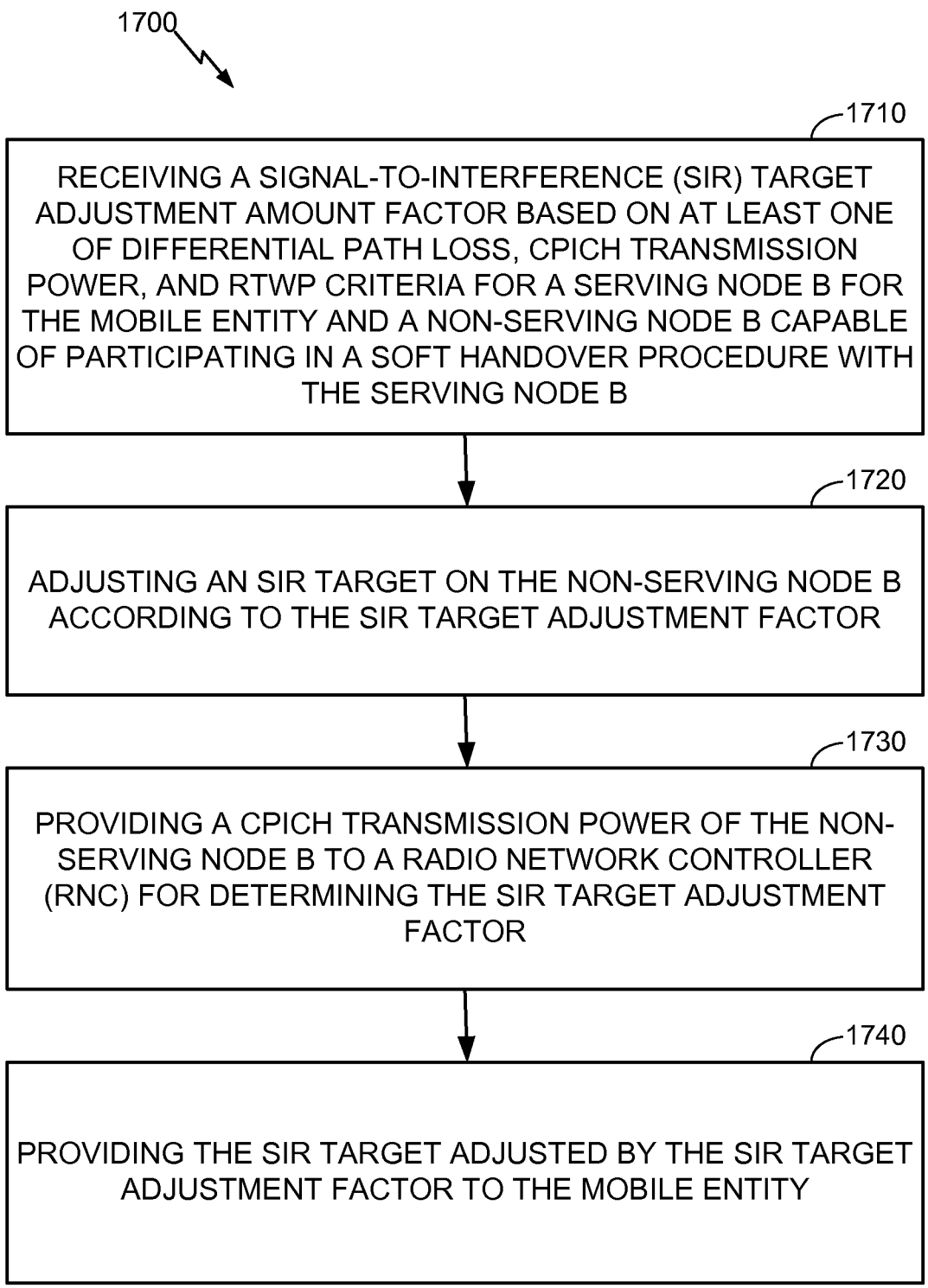
FIG. 17 illustrates an example method for using an adjusted SIR target from a radio access controller or access node at a non-serving NodeB for controlling transmit power of a mobile entity.

FIG. 17 illustrates an example method 1700 for using an adjusted SIR target from a radio access controller or access node at a non-serving NodeB for controlling transmit power of a mobile entity. The method 1700 may be understood as a non-serving NodeB counterpart to the method 1400, which in contrast may be performed by an RNC or serving node. The method 1700 may include, at 1710, receiving a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. The method 1700 may include, at 1720, adjusting an SIR target on the non-serving NodeB according to the SIR target adjustment factor. The method 1700 may additionally include, at 1730, providing a CPICH transmission power of the non-serving NodeB to a RNC for determining the SIR target adjustment factor. The method 1700 may additionally include, at 1740, comprising providing the SIR target adjusted by the SIR target adjustment factor to the mobile entity. The providing operations 1740 and 1740 are optional to the method 1700.

Figure 18:
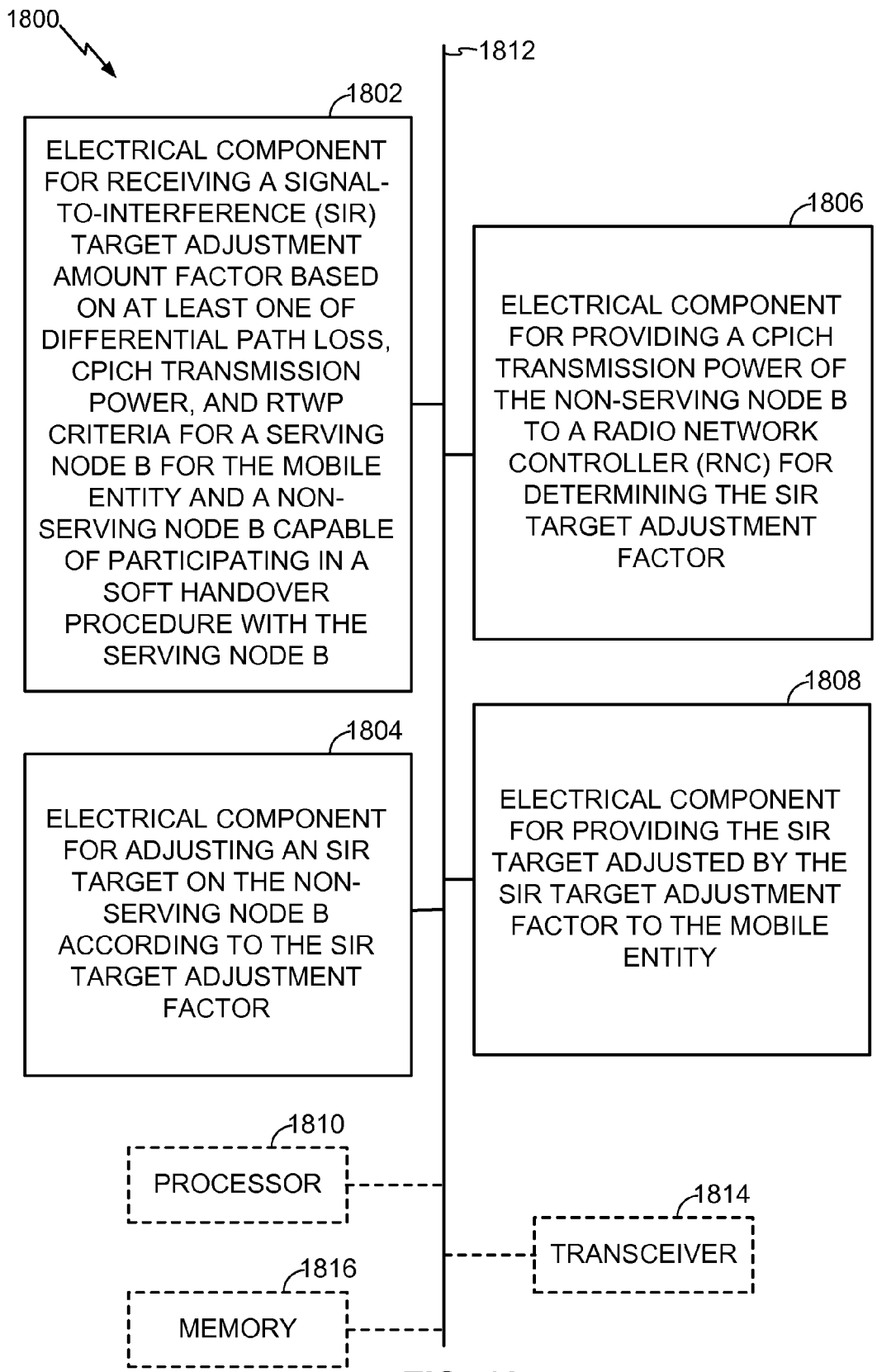
FIG. 18 illustrates an exemplary apparatus for using an adjusted SIR target from a radio access controller or access node at a non-serving NodeB for controlling transmit power of a mobile entity.

With reference to FIG. 18, there is provided an exemplary apparatus 1800 that may be configured as an access node in a wireless network, or as a processor or similar device for use within the access node, for using an adjusted SIR target from a radio access controller or access node at a non-serving NodeB for controlling transmit power of a mobile entity. The apparatus 1800 may include functional blocks that can represent functions implemented by a processor, software, or combination thereof (e.g., firmware).

In one embodiment, the apparatus 1800 may include an electrical component or module 1802 for receiving a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. For example, the electrical component 1802 may include at least one control processor, or the like, coupled to a receiver. The component 1802 may be, or may include, a means for receiving a SIR target adjustment amount factor based on at least one of differential path loss, CPICH transmission power, and RTWP criteria for a serving NodeB for the mobile entity and a non-serving NodeB capable of participating in a soft handover procedure with the serving NodeB. Said means may include at least one control processor operating an algorithm. The algorithm may operate in an application to perform the receiving, for example by monitoring a control channel from a RNC, and recognizing the SIR target adjustment amount in information transmitted in the control channel. The RNC may determine the SIR target based on at least one of differential path loss, CPICH transmission power, and RTWP criteria for a serving NodeB for the mobile entity and the non-serving NodeB. The application may operate on a non-serving NodeB.

The apparatus 1800 may include an electrical component 1804 for adjusting an SIR target on the non-serving NodeB according to the SIR target adjustment factor. For example, the electrical component 1804 may include at least one control processor coupled to a memory. The component 1804 may be, or may include, a means for adjusting an SIR target on the non-serving NodeB according to the SIR target adjustment factor. Said means may include the at least one control processor operating an algorithm. The algorithm may operate in an application to perform the adjusting, for example by performing an arithmetic operation using the SIR target adjustment factor to obtain an adjusted SIR target, and then storing the adjusted SIR target as a variable used in modulating transmission power to achieve a targeted SIR.

The apparatus 1800 may include an electrical component 1806 for providing a CPICH transmission power of the non-serving NodeB to a RNC for determining the SIR target adjustment factor. The component 1806 may be, or may include, a means for providing a CPICH transmission power of the non-serving NodeB to an RNC for determining the SIR target adjustment factor. Said means may include at least one control processor operating an algorithm. The algorithm may operate in an application to perform the providing, for example by obtaining a measurement or determination of CPICH transmission power, and transmitting an indication of the CPICH transmission power to the RNC.

The apparatus 1800 may include an electrical component 1808 for providing the SIR target adjusted by the SIR target adjustment factor to the mobile entity. The component 1808 may be, or may include, a means for providing the SIR target adjusted by the SIR target adjustment factor to the mobile entity. Said means may include at least one control processor operating an algorithm. The algorithm may operate in an application to perform the providing, for example by retrieving a stored or calculated adjusted SIR target from a memory, and transmitting the adjusted target to the mobile entity.

In related aspects, the apparatus 1800 may optionally include a processor component 1810 having at least one processor, in the case of the apparatus 1800 configured as a network entity. The processor 1810, in such case, may be in operative communication with the components 1802-1808 or similar components via a bus 1812 or similar communication coupling. The processor 1810 may initiate and schedule the processes or functions performed by electrical components 1802-1808.

In further related aspects, the apparatus 1800 may include a radio transceiver component 1814. A stand alone receiver and/or stand alone transmitter may be used in lieu of or in conjunction with the transceiver 1814. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for effecting the processes and behavior of the components 1802-1808, and subcomponents thereof, or the processor 1810, or the methods disclosed herein. The memory component 1816 may retain instructions for executing functions associated with the components 1802-1808. While shown as being external to the memory 1816, it is to be understood that the components 1802-1808 can exist within the memory 1816.

Enhanced HSDPA Serving Node Selection

Yet another distinct technique for improving HS-DPCCH decoding during soft handovers may be summarized as enhanced HSDPA serving node selection. This method considers the uplink quality in the HSDPA serving cell selection instead of only considering the downlink quality. First of all, a candidate cell for HSDPA serving cell is defined as A cell is $SHO$ is a candidate if $$\begin{cases} (Ecp/Io)_{dB,best\_DL\_cell} - (Ecp/Io)_{dB} \leq XdB, \text{ and} \\ Q_{best\_DL\_cell} - Q \geq YdB, \text{ and} \\ HSDPA \text{ power resource} \geq Z \end{cases}$$

which means that a cell in Soft HandOver (SHO) is a candidate if it has at most XdB lower downlink (DL) Ecp/Io than the best DL cell but at least YdB smaller Q than the best DL cell, where Q is the uplink quality indicator for a cell and is defined as one of the following options (same option for all cells)

$$Q = \begin{cases} \text{Path Loss } (PL), \text{ or} \\ CPICH \text{ power, or} \\ \text{Received Total Wideband Power } (RTWP), \text{ or} \\ \text{Target } RTWP, \text{ or} \\ PL + RTWP, \text{ or} \\ PL + \text{Target } RTWP, \text{ or} \\ CPICH \text{ power} + RTWP, \text{ or} \\ CPICH \text{ power} + \text{Target } RTWP \end{cases}$$

where the path loss is from the mobile to the cell, the RTWP (or equivalently Io, or RoT) is measured at the cell, and the CPICH transmit power and the target RTWP are set by the cell. All the above parameters may be in dB. A smaller Q may indicate a better uplink/reverse link quality. Q may be computed at a mobile entity, NodeB, or RNC. In case of an RNC, the RNC will compute Q for each cell based on the information collected from both the mobile and the cell. Also, the candidate cell should have HSDPA power resource greater than a threshold Z. The power resource can be computed as the total power allocated for HSDPA divided by the number of currently served HSDPA users. Instead of the best DL cell, HSDPA serving cell can be chosen as the candidate cell defined above with the largest power resource, the largest DL Ecp/Io, or the smallest Q. If the candidate cell does not exist, the best DL cell may still be used as the HSDPA serving cell.

In one aspect, the enhanced HSDPA serving node selection may be designed to select the closer node as the serving node for a mobile entity, making use of path loss information in the HSDPA serving node selection. Instead of the best downlink node, the HSDPA serving node may be selected, for example, as the one with at most "X" dB lower downlink Ecp/Io than the best downlink node, but at least "Y" dB smaller path loss than the best downlink node. For example, HSDPA serving node can be a non-best node in the active set but with at least 10 dB smaller path loss than the best node, so that the small downlink signal-to-noise degradation is traded for much better uplink feedback quality to reduce the mobile entity transmission power and hence the interference to the neighboring nodes. In addition, compared with boosting HS-DPCCH T2P, the received HS-DPCCH power at the HSDPA serving node will be more stable, since the serving node now becomes the closer node and hence essentially determines the uplink power control.

Besides the path loss, the HSDPA serving node selection can be further extended by also considering the downlink Ecp/Io, downlink loading, and uplink RTWP (or equivalently Io, RoT). For example, candidate HSDPA serving nodes may be defined as those with at most "X" dB lower downlink Ecp/Io than the best downlink NodeBut at least "Y" dB smaller path loss+RTWP than the best downlink node. In the foregoing examples, the values of "X" and "Y" may be selected to provide effective serving node selection under various conditions. For example, X=3 and Y=10 may be initially selected and can be further optimized based on conditions.

In the alternative, or in addition, the HSDPA serving node may be selected as the candidate node with the largest power resource, which may be computed as the total power allocated for HSDPA divided by the number of currently served HSDPA users. Also, the power resource of each candidate node should be greater than a certain threshold. If such candidate node does not exist, the best downlink node may still be used as the HSDPA serving node.

Figure 19:
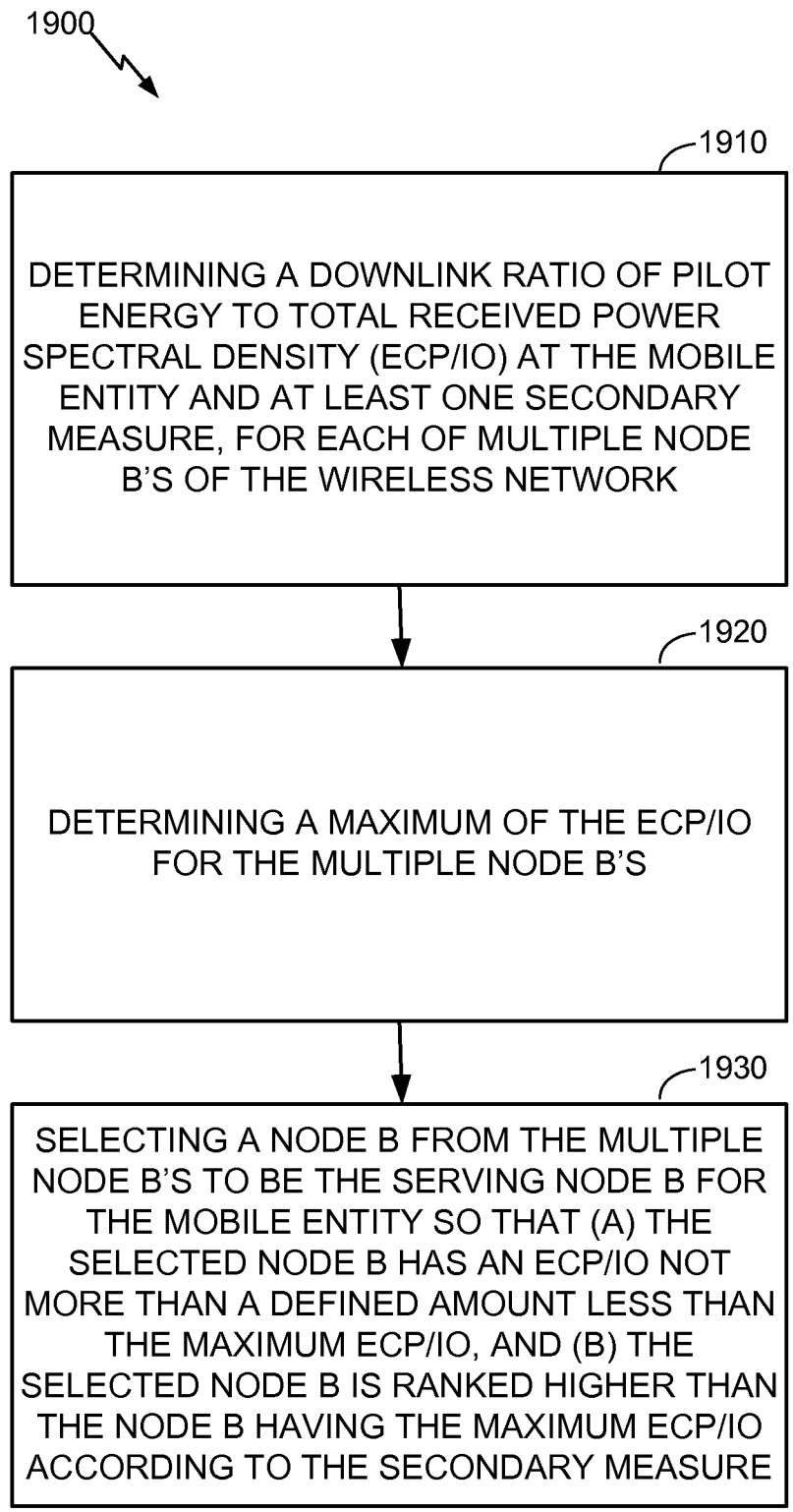
FIG. 19 illustrates an example method for selecting a serving NodeB so as to minimize or avoid dedicated physical control channel decoding issues during a soft handover.

Consistent with the foregoing, FIG. 19 illustrates an example method 1900 for selecting a serving NodeB so as to minimize or avoid dedicated physical control channel decoding issues during a soft handover. The method 1900 may include, at 1902, determining a downlink ratio of pilot energy to total received power spectral density (Ecp/Io) at the mobile entity and at least one secondary measure, for each of multiple node BsNodeBs of the wireless network. The method 1900 may further include, at 1920, determining a maximum of the Ecp/Io for the multiple node BsNodeBs. The method 1900 may further include, at 1930, selecting a NodeB from the multiple node BsNodeBs to be the serving NodeB for the mobile entity so that (a) the selected NodeB has an Ecp/Io not more than a defined amount less than the maximum Ecp/Io, and (b) the selected NodeB is ranked higher than the NodeB having the maximum Ecp/Io according to the secondary measure.

FIG. 20 shows further aspects 2000 of the method 1900. As indicated by the double arrows connecting the respective blocks, each block is independent of the others. Therefore, the method 1900 may include any or all of the blocks 2000, in any operative order. The secondary measure referenced at blocks 1910 and 1930 may include downlink loading. For such case, as shown at 2010, the method 1900 may further include ranking the selected NodeB higher in response to the downlink loading for the selected NodeB being less than the downlink loading for the NodeB having the maximum Ecp/Io. In the alternative, or in addition, the secondary measure may include uplink path loss. In such case, the method 1900 may further include, at 2020, ranking the selected NodeB higher in response to the uplink path loss for the selected NodeB being less than the uplink path loss for the NodeB having the maximum Ecp/Io. In the alternative, or in addition, the secondary measure may include an uplink power spectral density. In such case, the method 1900 may further include, as shown at 2030, ranking the selected NodeB higher in response to the uplink power spectral density for the selected NodeB being less than the uplink power spectral density for the NodeB having the maximum Ecp/Io. In the alternative, or in addition, the secondary measure may include a power resource as discussed above. In such case, the method 1900 may further include, as shown at 2040, ranking the selected NodeB higher in response to the power resource for the selected NodeB being greater than the power resource for the NodeB having the maximum Ecp/Io.

In another embodiment, the secondary measure may include a sum or other aggregation of uplink path loss and uplink power spectral density. In such case, the method 1900 may include, at 2050, ranking the selected NodeB higher in response to the sum (or other aggregation) of uplink path loss and uplink power spectral density for the selected NodeB being less than the sum (or other aggregation) of uplink path loss and uplink power spectral density for the NodeB having the maximum Ecp/Io.

Figure 21:
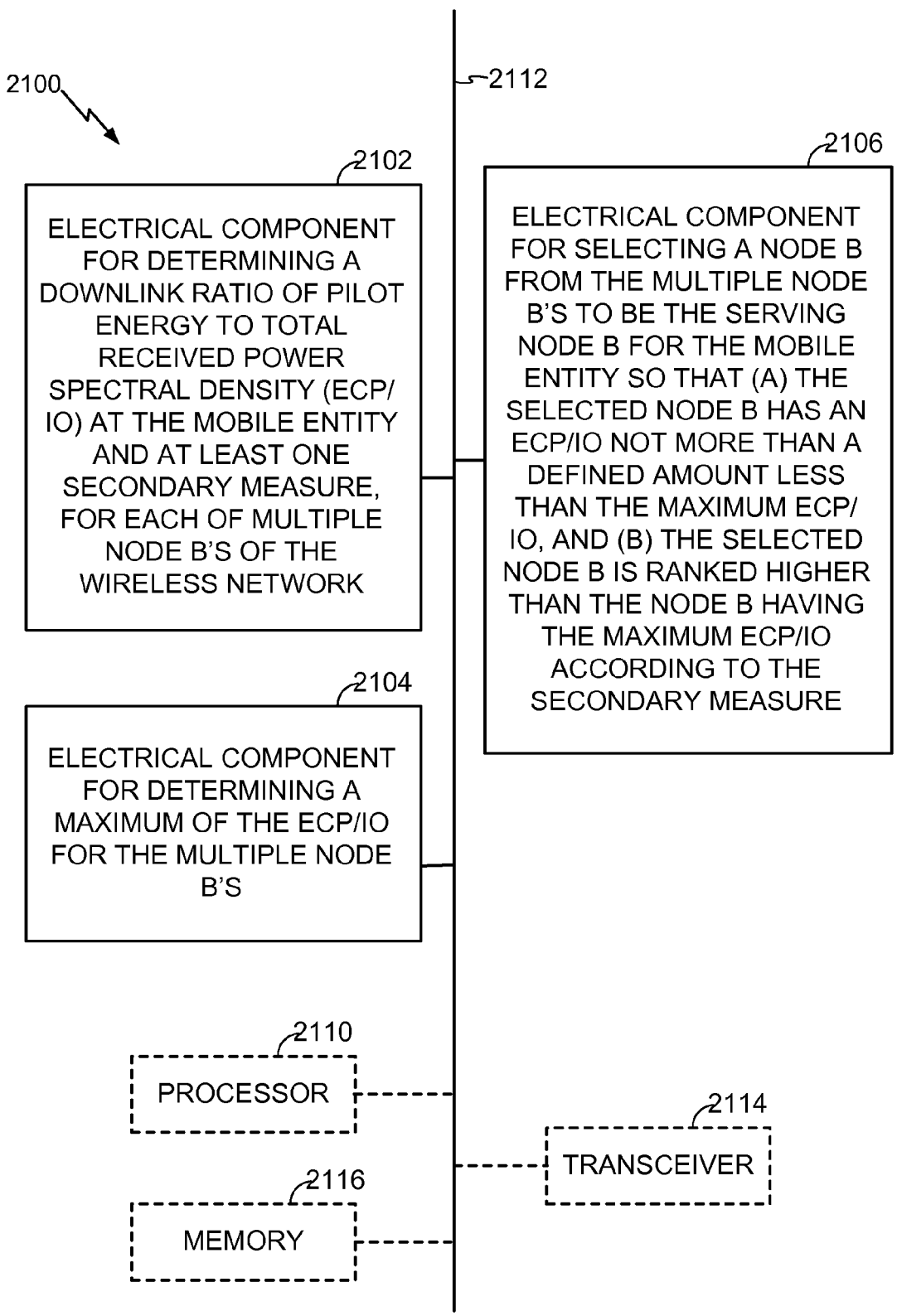
FIG. 21 illustrates an exemplary apparatus for selecting a serving NodeB so as to minimize or avoid dedicated physical control channel decoding issues during a soft handover.

With reference to FIG. 21, there is provided an exemplary apparatus 2100 that may be configured as an RNC or access node in a wireless network, or as a processor or similar device for use within the RNC, for selecting a serving NodeB so as to minimize or avoid dedicated physical control channel decoding issues during a soft handover. The apparatus 2100 may include functional blocks that can represent functions implemented by a processor, software, or combination thereof (e.g., firmware).

In one embodiment, the apparatus 2100 may include an electrical component or module 2102 for determining a downlink ratio of pilot energy to total received power spectral density (Ecp/Io) at the mobile entity and at least one secondary measure, for each of multiple NodeBs of the wireless network. For example, the electrical component 2102 may include at least one control processor, or the like, coupled to a receiver. The component 2102 may be, or may include, a means for determining a downlink Ecp/Io at the mobile entity and at least one secondary measure, for each of multiple NodeBs. Said means may include at least one control processor operating an algorithm. The algorithm may operate in an application to perform the providing, for example by, for each of multiple NodeBs, obtaining a downlink Ecp measure, obtaining a downlink Io measure, calculating a ratio of the measures, and obtaining at least one secondary measure. The at least one secondary measure may be, or may include, a downlink loading, an uplink path loss, a power resource, or an uplink power spectral density.

The apparatus 2100 may include an electrical component 2104 for determining a maximum of the Ecp/Io for the multiple NodeBs. For example, the electrical component 2104 may include at least one control processor. The component 2104 may be, or may include, a means for determining a maximum of the Ecp/Io for the multiple NodeBs. Said means may include at least one control processor operating an algorithm. The algorithm may operate in an application to perform the determining, for example by using a comparative sequence operating on a set of Ecp/Io values.

The apparatus 2100 may include an electrical component 2106 for selecting a NodeB from the multiple NodeBs to be the serving NodeB for the mobile entity so that (a) the selected NodeB has an Ecp/Io not more than a defined amount less than the maximum Ecp/Io, and (b) the selected NodeB is ranked higher than the NodeB having the maximum Ecp/Io according to the secondary measure. The component 2102 may be, or may include, a means for selecting a NodeB from the multiple NodeBs to be the serving NodeB for the mobile entity so that (a) the selected NodeB has an Ecp/Io not more than a defined amount less than the maximum Ecp/Io, and (b) the selected NodeB is ranked higher than the NodeB having the maximum Ecp/Io according to the secondary measure. Said means may include at least one control processor operating an algorithm. The algorithm may operate in an application to perform the selecting, for example by determining an Ecp/Io ratio for each of an available set of NodeBs or recovering stored ratio values previously determined, comparing each Ecp/Io ratio with a stored maximum Ecp/Io and rejecting NodeBs from a candidate list if exceeding the threshold, ranking the remaining candidates based on the secondary measure, and selecting the highest-ranked candidate in the list. The apparatus 2100 may include similar electrical components for performing any or all of the additional operations described in connection with FIG. 20, which for illustrative simplicity are not shown in FIG. 21.

In related aspects, the apparatus 2100 may optionally include a processor component 2110 having at least one processor, in the case of the apparatus 2100 configured as a network entity. The processor 2110, in such case, may be in operative communication with the components 2102-2106 or similar components via a bus 2112 or similar communication coupling. The processor 2110 may initiate and schedule the processes or functions performed by electrical components 2102-2106.

In further related aspects, the apparatus 2100 may include a radio transceiver component 2114. A stand alone receiver and/or stand alone transmitter may be used in lieu of or in conjunction with the transceiver 2114. The apparatus 2100 may optionally include a component for storing information, such as, for example, a memory device/component 2116. The computer readable medium or the memory component 2116 may be operatively coupled to the other components of the apparatus 2100 via the bus 2112 or the like. The memory component 2116 may be adapted to store computer readable instructions and data for effecting the processes and behavior of the components 2102-2106, and subcomponents thereof, or the processor 2110, or the methods disclosed herein. The memory component 2116 may retain instructions for executing functions associated with the components 2102-2106. While shown as being external to the memory 2116, it is to be understood that the components 2102-2106 can exist within the memory 2116.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, electronic memory devices, or any other medium that can be used to carry or store desired program code in the form of instructions or data structures and that can be accessed by a computer. Disk and disc, as used herein, includes Compact Disc (CD), laser disc, optical disc, Digital Versatile Disc (DVD), floppy disk and blu-ray disc, wherein disks usually encode data magnetically, while discs encode data optically. Combinations of the above should also be included within the scope of non-transitory computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for controlling transmission power of a mobile entity in a wireless communications network, comprising:
   determining a difference indicative of an amount by which path loss for a wireless link between the mobile entity and a serving NodeB of the wireless communications network exceeds a minimum of path losses for wireless links between the mobile entity and non-serving NodeBs of the wireless communications network; and
   instructing the mobile entity to boost a traffic-to-pilot transmission power offset for transmissions on a high-speed dedicated physical control channel to the serving NodeB, in proportion to the difference.

2. The method of claim 1, wherein the determining the difference further comprises comparing path loss between the serving NodeB and the mobile entity as reported by the mobile entity to a minimum of one or more path losses between the non-serving NodeBs and the mobile entity as reported by the mobile entity.

3. The method of claim 2, wherein the determining the difference further comprises comparing received total wideband power (RTWP) from the serving NodeB to a minimum of RTWP from one or more of the non-serving NodeBs.

4. The method of claim 3, wherein the determining the difference further comprises comparing an aggregation of the path loss and RTWP from the serving NodeB to a minimum aggregation of the path loss and RTWP among one or more of the non-serving NodeBs.

5. The method of claim 2, wherein the determining the difference further comprises comparing a target received total wideband power (RTWP) for the serving NodeB to a minimum of target RTWPs as reported by one or more of the non-serving NodeBs.

6. The method of claim 5, wherein the determining the difference further comprises comparing an aggregation of the path loss and the target RTWP for the serving NodeB to a minimum aggregation of the path loss and the target RTWP among one or more of the non-serving NodeBs.

7. The method of claim 1, wherein the determining the difference further comprises comparing received total wideband power (RTWP) from the serving NodeB to a minimum of RTWP from one or more of the non-serving NodeBs.

8. The method of claim 1, wherein the determining the difference further comprises comparing a target received total wideband power (RTWP) from the serving NodeB to a minimum of target RTWPs as reported by one or more of the non-serving NodeBs.

9. The method of claim 1, wherein the determining the difference further comprises comparing a common pilot channel (CPICH) transmission power of the serving NodeB of the wireless communications network to a minimum CPICH transmission power of non-serving NodeBs.

10. The method of claim 9, wherein the determining the difference further comprises comparing the CPICH transmission power of the serving NodeB aggregated with at least one of received total wideband power (RTWP) of the serving NodeB and a target RTWP for the serving NodeB, to a minimum aggregation of CPICH transmission power and a corresponding one of RTWP and target RTWP among one or more of the non-serving NodeBs as reported by one or more of the non-serving NodeBs.

11. An apparatus, comprising:
at least one processor configured to: determine a difference indicative of an amount by which path loss for a wireless link between a mobile entity and a serving NodeB of a wireless communications network exceeds a minimum of path losses for wireless links between the mobile entity and non-serving NodeBs of the wireless network, and to instruct the mobile entity to boost a traffic-to-pilot transmission power offset for transmissions on a high-speed dedicated physical control to the serving NodeB, in proportion to the difference;
a memory coupled to the at least one processor for storing data; and
a transmitter coupled to the at least one processor for transmitting signals to the mobile entity.

12. The apparatus of claim 11, wherein the at least one processor is further configured to determine the difference by comparing path loss between the serving NodeB and the mobile entity as reported by the mobile entity to a minimum of one or more path losses between the non-serving NodeBs and the mobile entity as reported by the mobile entity.

13. The apparatus of claim 12, wherein the at least one processor is further configured to determine the difference by comparing the path loss from the serving NodeB aggregated with at least one of received total wideband power (RTWP) of the serving NodeB and a target RTWP for the serving NodeB, to a minimum aggregation of the path loss and a corresponding one of RTWP and target RTWP among one or more of the non-serving NodeBs as reported by one or more of the non-serving NodeBs.

14. The apparatus of claim 11, wherein the at least one processor is further configured to determine the difference by comparing a common pilot channel (CPICH) transmission power of a serving NodeB of the wireless communications network to a minimum CPICH transmission power of non-serving NodeBs.

15. The apparatus of claim 14, wherein the at least one processor is further configured to determine the difference by comparing the CPICH transmission power of the serving NodeB aggregated with at least one of received total wideband power (RTWP) of the serving NodeB and a target RTWP for the serving NodeB, to a minimum aggregation of CPICH transmission power and a corresponding one of RTWP and target RTWP among one or more of the non-serving NodeBs as reported by one or more of the non-serving NodeBs.

16. An apparatus, comprising:
means for determining a difference indicative of an amount by which path loss for a wireless link between a mobile entity and a serving NodeB of a wireless communications network exceeds a minimum of path losses for wireless links between the mobile entity and non-serving NodeBs of the wireless network;
means for instructing the mobile entity to boost a traffic-to-pilot transmission power offset for transmissions on a high-speed dedicated physical control to the serving NodeB, in proportion to the difference; and
means for transmitting signals to the mobile entity.

17. A non-transitory computer-readable medium comprising code for causing a computer to: determine a difference indicative of an amount by which path loss for a wireless link between a mobile entity and a serving NodeB of a wireless communications network exceeds a minimum of path losses for wireless links between the mobile entity and non-serving NodeBs of the wireless network, and to instruct the mobile entity to boost a traffic-to-pilot transmission power offset for transmissions on a high-speed dedicated physical control to the serving NodeB, in proportion to the difference.

18. A method for controlling transmission power in a mobile entity of a wireless communications network, comprising:
receiving a difference indicating an amount by which path loss for a wireless link between the mobile entity and a serving NodeB of the wireless communications network exceeds a minimum of path losses for wireless links between the mobile entity and non-serving NodeBs of the wireless network; and
boosting a traffic-to-pilot transmission power offset for transmissions on a high-speed dedicated physical control channel to the serving NodeB, in proportion to the difference.

19. The method of claim 18, further comprising reporting a path loss between the serving NodeB and the mobile entity and one or more path losses between the non-serving NodeBs and the mobile entity to a radio network controller for determining the difference.

20. The method of claim 18, further comprising reporting received total wideband power (RTWP) from the serving NodeB and RTWP from one or more of the non-serving NodeBs to a radio network controller for determining the difference.

21. An apparatus, comprising:
at least one processor configured to: receive a difference indicating an amount by which path loss for a wireless link between a mobile entity and a serving NodeB of a wireless communications network exceeds a minimum of path losses for wireless links between the mobile entity and non-serving NodeBs of the wireless network, and boost a traffic-to-pilot transmission power offset for transmissions on a high-speed dedicated physical control channel to the serving NodeB, in proportion to the difference;
a memory coupled to the at least one processor for storing data; and
a receiver coupled to the at least one processor for receiving signals at the apparatus.

22. The apparatus of claim 21, wherein the at least one processor is further configured to report a path loss between the serving NodeB and the mobile entity and one or more path losses between the non-serving NodeBs and the mobile entity to a radio network controller for determining the difference.

23. The apparatus of claim 21, wherein the at least one processor is further configured to report received total wideband power (RTWP) from the serving NodeB and RTWP from one or more of the non-serving NodeBs to a radio network controller for determining the difference.

24. An apparatus, comprising:
means for receiving a difference indicating an amount by which path loss for a wireless link between a mobile entity and a serving NodeB of a wireless communications network exceeds a minimum of path losses for wireless links between the mobile entity and non-serving NodeBs of the wireless network;
means for boosting a traffic-to-pilot transmission power offset for transmissions on a high-speed dedicated physical control channel to the serving NodeB, in proportion to the difference; and
means for receiving signals at the apparatus.

25. A non-transitory computer-readable medium comprising code for causing a computer to: receive a difference indicating an amount by which path loss for a wireless link between a mobile entity and a serving NodeB of a wireless communications network exceeds a minimum of path losses for wireless links between the mobile entity and non-serving NodeBs of the wireless network, and boost a traffic-to-pilot transmission power offset for transmissions on a high-speed dedicated physical control channel to the serving NodeB, in proportion to the difference.

* * * * *